United States Patent
Wang et al.

(10) Patent No.: US 11,736,292 B2
(45) Date of Patent: Aug. 22, 2023

(54) ACCESS TOKEN MANAGEMENT METHOD, TERMINAL, AND SERVER

(71) Applicant: Huawei Technologies Co., Ltd., Shenzhen (CN)

(72) Inventors: Sishan Wang, Beijing (CN); Jingqing Mei, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 16/758,095

(22) PCT Filed: Oct. 23, 2017

(86) PCT No.: PCT/CN2017/107287
§ 371 (c)(1),
(2) Date: Apr. 22, 2020

(87) PCT Pub. No.: WO2019/079928
PCT Pub. Date: May 2, 2019

(65) Prior Publication Data
US 2020/0336309 A1  Oct. 22, 2020

(51) Int. Cl.
*H04L 29/06* (2006.01)
*H04L 9/32* (2006.01)
(Continued)

(52) U.S. Cl.
CPC .......... *H04L 9/3213* (2013.01); *H04L 9/0861* (2013.01); *H04L 9/0891* (2013.01);
(Continued)

(58) Field of Classification Search
CPC ..... H04L 63/102; H04L 29/06; H04L 9/3213; H04L 63/0807; H04L 63/0876;
(Continued)

(56) References Cited

U.S. PATENT DOCUMENTS 10,057,246 B1 *  8/2018  Drozd ................ G06F 21/335
11,233,649 B2 *  1/2022  Li ............................ H04L 9/30
(Continued)

FOREIGN PATENT DOCUMENTS

CN       102904894 A    1/2013
CN       104601590 A    5/2015
(Continued)

OTHER PUBLICATIONS

Half-Baked Cookies: Hardening Cookie-Based Authentication for the Modern Web; (Yogesh Mundada;Nick Feamster; Balachander Krishnamurthy);ACM on Asia Conference on Computerand Communications Security, pp. 675-685; May 2016 (Year: 2016).*

(Continued)

*Primary Examiner* — Mohammad A Siddiqi
(74) *Attorney, Agent, or Firm* — Conley Rose, P.C.

(57) ABSTRACT

Embodiments of this application relate to an access token management method. The method includes: obtaining, by a server, an access token and login information of an authorized account corresponding to the access token in a terminal, where the access token is a credential used for accessing a protected resource in the server, and the authorized account is an account that logs in to a resource authorization application on the terminal when the resource authorization application authorizes the access token; and when the login information indicates that the authorized account is in a non-login state, performing, by the server, invalidation processing on the access token.

20 Claims, 11 Drawing Sheets

(51) Int. Cl.
  *H04L 9/08* (2006.01)
  *H04L 9/40* (2022.01)
(52) U.S. Cl.
  CPC ........ *H04L 63/0876* (2013.01); *H04L 63/102* (2013.01); *H04L 63/108* (2013.01)
(58) Field of Classification Search
  CPC ..... H04L 9/0891; H04L 63/10; H04L 9/0861; H04L 63/108; H04L 67/02; H04L 63/0815; G06F 21/31; G06F 21/33
  See application file for complete search history.

(56) References Cited

U.S. PATENT DOCUMENTS

| | | | |
|---|---|---|---|
| 2012/0227089 | A1 | 9/2012 | Lee et al. |
| 2013/0173474 | A1* | 7/2013 | Ranganathan ....... G06Q 20/401 705/67 |
| 2013/0198114 | A1* | 8/2013 | Pinhanez ............. G06Q 10/101 706/12 |
| 2013/0232161 | A1* | 9/2013 | Yang ....................... G06Q 30/02 707/758 |
| 2014/0040993 | A1 | 2/2014 | Lorenzo et al. |
| 2014/0282983 | A1* | 9/2014 | Ju ....................... H04W 12/068 726/8 |
| 2014/0380428 | A1 | 12/2014 | Kobayashi |
| 2015/0062615 | A1* | 3/2015 | Furutani ................. G06F 21/41 358/1.14 |
| 2015/0089622 | A1* | 3/2015 | Sondhi .................... H04L 63/08 726/9 |
| 2015/0326577 | A1* | 11/2015 | Carlson ................ H04L 63/083 713/155 |
| 2015/0365399 | A1 | 12/2015 | Biswas et al. |
| 2015/0370615 | A1* | 12/2015 | Pi-Sunyer .............. G08B 17/10 700/276 |
| 2016/0028737 | A1* | 1/2016 | Srinivasan .......... H04L 63/0807 726/4 |
| 2016/0180354 | A1* | 6/2016 | Chun ................. G06Q 30/0201 705/7.29 |
| 2017/0064550 | A1* | 3/2017 | Sundaresan ......... H04W 12/084 |
| 2017/0118167 | A1* | 4/2017 | Subramanya ......... H04L 61/305 |
| 2017/0374075 | A1* | 12/2017 | Boval ................... H04L 63/083 |
| 2020/0092296 | A1* | 3/2020 | Brinckman ......... H04W 12/086 |

FOREIGN PATENT DOCUMENTS

| | | |
|---|---|---|
| CN | 105847277 A | 8/2016 |
| CN | 105991614 A | 10/2016 |
| CN | 106209749 A | 12/2016 |
| CN | 106657140 A | 5/2017 |
| CN | 106686012 A | 5/2017 |

OTHER PUBLICATIONS

Meng, et al., "Design and implementation of multiple terminal single sign-on based on mobile terminal," Computer Engineering and Design, vol. 35, No. 5, May 2014, 8 pages.
Chen, J., et al., "Security Evaluations and Countermeasures of Single Sign-on Systems Based on OAuth Protocol," Electronic Sci. Tech., Sep. 15, 2017, 4 pages.
Park, J., et al.,"A Study of OAuth 2.0 Risk Notification and Token Revocation from Resource Server," WISA 2015 Revised Selected Papers of the 16th International Workshop on Information Security Applications—vol. 9503, XP047338957, Aug. 2015, pp. 281-287.
Lodderstedt, T., Ed., et al., "OAuth 2.0 Token Revocation," RFC 7009, Aug. 2013, 11 pages.
Motorola Solutions, et al., "33.179 OpenID Connect Profile for MCPTT," 3GPP TSG SA WG3 (Security) Meeting #82, S3-160014, Feb. 1-5, 2016, Dubrovnik, CR, 11 pages.

* cited by examiner

ACCESS TOKEN MANAGEMENT METHOD, TERMINAL, AND SERVER

CROSS-REFERENCE TO RELATED APPLICATIONS

This application is a National Stage of International Application No. PCT/CN2017/107287, filed on Oct. 23, 2017, which is hereby incorporated by reference in its entirety.

TECHNICAL HELD

This application relates to the field of communications technologies, and in particular, to an access token management method, a terminal, and a server.

BACKGROUND

The open authorization (Open Authorization, O-Auth) 2.0 protocol is a secure, open, and simple user resource authorization standard formulated by the internet engineering task force (Internet Engineering Task Force, IETF). In the protocol, an application A and an application B are installed on a terminal. In a state in which an application A account of a first user logs in to the application A, the first user may authorize the application B to obtain an access token (access token) from an authorization server of the application A. The application B may obtain a user resource such as a nickname or a profile picture in a server of the application A based on the access token, and log in to a server of the application B.

In the prior art, when the first user needs to lend a terminal to a second user or needs to share a terminal with a second user, even if the first user logs out of the application A, the second user can still use the access token that the application B obtains by using the application A, obtain the user resource of the first user in the server of the application A by using the access token, and log in to the application B. As a result, related information that is of the application B and the application A and that is of the first user is exposed to the second user, causing a leakage of privacy information and property information that are of the first user, and the like.

SUMMARY

Embodiments of this application provide an access token management method, a terminal, and a server. According to the method, an access token may be associated with an authorized account that authorizes the access token, and when it is detected that a status of an authorization application on a terminal does not match the authorized account, the access token may be restricted, so that in a state in which the authorized account logs out of the authorization application, use of the access token authorized by the authorized account is restricted, thereby protecting user information.

According to a first aspect, an access token management method is provided. The method includes: obtaining, by a server, an access token and login information of an authorized account corresponding to the access token in a terminal, where the access token is a credential used for accessing a protected resource in the server, and the authorized account is an account that logs in to a resource authorization application on the terminal when the resource authorization application authorizes the access token; and when the login information indicates that the authorized account is in a non-login state, performing, by the server, invalidation processing on the access token.

In a possible implementation, the method further includes: receiving, by the server, an access token generation request, where the access token generation request includes an identifier of the authorized account; and generating, by the server, the access token based on the access token generation request, and establishing a matching relationship between the access token and the authorized account based on the identifier of the authorized account. In this implementation, the server may establish the matching relationship between the access token and the authorized account, so that the server can manage the access token by using the authorized account.

In a possible implementation, the login information includes an identifier of a current login account of the resource authorization application; and the performing, by the server, invalidation processing on the access token includes: determining, by the server based on the matching relationship between the access token and the authorized account, whether the current login account matches the access token; and when the current login account does not match the access token, performing, by the server, invalidation processing on the access token.

In this implementation, the login information of the authorized account is represented by the current login account of the resource authorization application. To be specific, if the current login account of the resource authorization application is the authorized account, it indicates that the authorized account is in a login state; or if the current login account of the resource authorization application is not the authorized account, it indicates that the authorized account is in a non-login state; and further, the server performs corresponding processing on the access token.

In a possible implementation, the obtaining, by a server, an access token and login information of an authorized account corresponding to the access token in a terminal includes: receiving, by the server, a resource access request from the terminal, where the resource access request includes the access token and the login information.

In a possible implementation, the obtaining, by a server, an access token and login information of an authorized account corresponding to the access token in a terminal includes: receiving, by the server, the access token and a terminal identifier from the terminal; and obtaining, by the server, the login information based on the terminal identifier, where the login information includes the identifier of the current login account of the resource authorization application.

In a possible implementation, the server is an authorization server; and the obtaining, by a server, an access token and login information of an authorized account corresponding to the access token in a terminal includes: obtaining, by the server, the access token and the login information from a resource server, where the access token and the login information that are in the resource server are received from the terminal.

In a possible implementation, the server is an authorization server; and the obtaining, by a server, an access token and login information of an authorized account corresponding to the access token in a terminal includes: receiving, by the server, the access token and the login information from the resource server, where the login information in the resource server is obtained through querying performed by the resource server based on a terminal identifier, and the terminal identifier in the resource server is received by the resource server from the terminal.

In a possible implementation, the login information includes information about that the authorized account logs out of the resource authorization application or information about that the resource authorization application is deleted.

In this implementation, invalidation processing may be performed on the access token based on the information about that the authorized account logs out of the resource authorization application or the information about that the resource authorization application is deleted.

In a possible implementation, the performing, by the server, invalidation processing on the access token includes any one of the following:

deleting, by the server, the access token;

freezing, by the server, the access token; or denying, by the server, access to a user resource initiated by the terminal by using the access token.

In this implementation, the server performs invalidation processing on the access token, so that the terminal can no longer log in to a resource request application by using the access token, thereby protecting user information.

According to a second aspect, an access token management method is provided. The method includes: obtaining, by a server, an access token restriction request, where the access token restriction request includes a terminal identifier and an identifier of an authorized account of a resource authorization application on a terminal corresponding to the terminal identifier, and the authorized account is an account that logs in to the resource authorization application when the resource authorization application authorizes an access token; and performing, by the server based on the access token restriction request, invalidation processing on an access token corresponding to the terminal identifier and the identifier of the authorized account.

According to the access token management method provided in the second aspect, the server may receive the access token restriction request from another device, and the access token restriction request may be sent when the device finds that the authorized account already logs out of the terminal, so that the server can perform invalidation processing on the corresponding access token directly based on the restriction request.

In a possible implementation, the method further includes: receiving, by the server, an access token generation request, where the access token generation request includes the terminal identifier and the identifier of the authorized account; and generating, by the server, the access token based on the access token generation request, and establishing a matching relationship between the access token, the authorized account, and the terminal identifier.

In a possible implementation, the server is an authorization server; and the obtaining, by a server, an access token restriction request includes: obtaining, by the server, the access token restriction request from a resource server.

In this implementation, when finding, through querying, that the authorized account does not log in on the terminal, the resource server may send the access token restriction request to the server, so that the server performs invalidation processing on the access token corresponding to the authorized account.

In a possible implementation, the obtaining, by a server, an access token restriction request includes: obtaining, by the server, the access token restriction request from the terminal.

In this implementation, when finding, through querying, that the authorized account does not log in on the terminal, the terminal may send the access token restriction request to the server, so that the server performs invalidation processing on the access token corresponding to the authorized account.

In a possible implementation, the method further includes: sending, by the server, restriction information of the access token to the terminal identified by the terminal identifier, so that the terminal displays a prompt of unfreezing the access token by using the authorized account.

In a possible implementation, the performing, by the server based on the access token restriction request, invalidation processing on an access token corresponding to the terminal identifier and the identifier of the authorized account includes any one of the following:

deleting, by the server, the access token;

freezing, by the server, the access token; or denying, by the server, access to a user resource initiated by the terminal by using the access token.

According to a third aspect, an access token management method is provided. The method includes: sending, by a terminal to a server, an access token and login information of an authorized account corresponding to the access token in the terminal, where the access token is a credential used for accessing a protected resource in the server, and the authorized account is an account that logs in to a resource authorization application on the terminal when the resource authorization application authorizes the access token; and when the login information indicates that the authorized account is in a non-login state, the login information is used for the server to perform invalidation processing on the access token.

According to a fourth aspect, an access token management method is provided. The method includes: sending, by a terminal, an access token restriction request to a server, where the access token restriction request includes an identifier of the terminal and an identifier of an authorized account of a resource authorization application on the terminal, and the authorized account is an account that logs in to the resource authorization application when the resource authorization application authorizes an access token; and the access token restriction request is used for the server to perform invalidation processing on an access token corresponding to the identifier of the terminal and the identifier of the authorized account.

According to a fifth aspect, an access token management method is provided. The method includes: obtaining, by a terminal, current status information of a resource authorization application on the terminal; and restricting, by the terminal, an access token of a resource request application on the terminal based on the current status information of the resource authorization application, where the access token is an access token obtained by the resource request application from a server by using the resource authorization application when an authorized account is in a login state, and the access token and the authorized account have a matching relationship.

In a possible implementation, the current status information of the resource authorization application includes any one of the following:

a current login account of the resource authorization application is not the authorized account;

an account of the resource authorization application logs out; or the resource authorization application is deleted.

In a possible implementation, the restricting, by the terminal, an access token of a resource request application on the terminal based on the current status information of the resource authorization application includes any one of the following:

deleting, by the terminal, the access token;

freezing, by the terminal, the access token; or denying, by the terminal, extracting of the access token by the resource request application.

In a possible implementation, the method further includes: sending, by the terminal, an access token generation request to the server when the authorized account is in the login state, where the access token generation request includes an identifier of the authorized account, and the access token generation request is used for the server to generate the access token and establish the matching relationship between the access token and the authorized account; and receiving, by the terminal, the matching relationship from the server.

According to a sixth aspect, a server is provided. The server has a function of implementing the server in the method according to the first aspect, the second aspect, the third aspect, the fourth aspect, or the fifth aspect. The function may be implemented by hardware, or may be implemented by hardware executing corresponding software. The hardware or software includes one or more modules corresponding to the foregoing function.

According to a seventh aspect, a terminal is provided. The terminal has a function of implementing the terminal in the method according to the first aspect, the second aspect, the third aspect, the fourth aspect, or the fifth aspect. The function may be implemented by hardware, or may be implemented by hardware executing corresponding software. The hardware or software includes one or more modules corresponding to the foregoing function.

According to an eighth aspect, a server is provided. The server includes a processor, a memory, and a transceiver. The processor, the memory, and the transceiver may be configured to support the server in performing corresponding functions in the method according to the first aspect, the second aspect, the third aspect, the fourth aspect, or the fifth aspect.

According to a ninth aspect, a terminal is provided. The terminal includes a processor, a memory, and a transceiver. The processor, the memory, and the transceiver may be configured to support the terminal in performing corresponding functions in the method according to the first aspect, the second aspect, the third aspect, the fourth aspect, or the fifth aspect.

According to a tenth aspect, an access token management system is provided. The system includes the server according to the eighth aspect and the terminal according to the ninth aspect.

According to an eleventh aspect, a computer readable storage medium storing a program is provided. The program includes an instruction, and when the instruction is executed by a computer, the computer is enabled to perform the method according to the first aspect, the second aspect, the third aspect, the fourth aspect, or the fifth aspect.

According to a twelfth aspect, a computer program product including an instruction is provided. When the computer program product is run on a computer, the computer is enabled to perform the method according to the first aspect, the second aspect, the third aspect, the fourth aspect, or the fifth aspect.

The access token management method, the terminal, and the server that are provided in the embodiments of this application have the following beneficial effects: Corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

DESCRIPTION OF EMBODIMENTS

The following clearly and completely describes the technical solutions in the embodiments of this application with reference to the accompanying drawings in the embodiments of this application. Apparently, the described embodiments are merely some but not all of the embodiments of this application. All other embodiments obtained by a person skilled in the art based on the embodiments of this application shall fall within the protection scope of this application.

A terminal in the embodiments of this application may be specifically a mobile phone (mobile phone), a tablet computer (Pad), a wearable device (wearable device), a computer with a wireless transceiving function, a virtual reality (virtual reality, VR) terminal device, an augmented reality (Augmented Reality, AR) terminal device, a wireless terminal in industrial control (industrial control), a wireless terminal in self driving (self driving), a wireless terminal in telemedicine (remote medical), a wireless terminal in a smart grid (smart grid), a wireless terminal in transportation safety (transportation safety), a wireless terminal in a smart city (smart city), a wireless terminal in a smart home (smart home), or the like.

Figure 1:
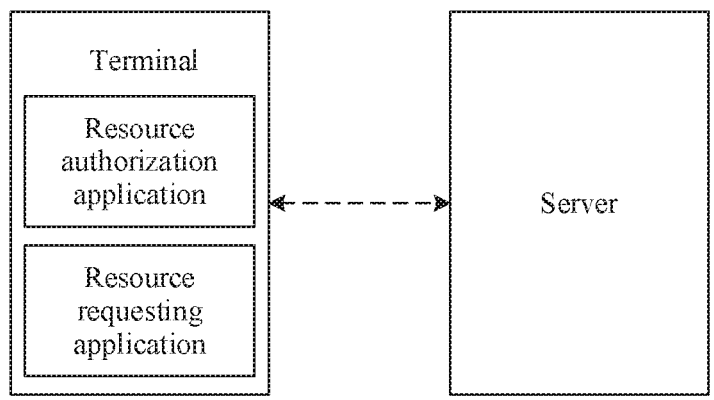
FIG. 1 shows an application architecture of an access token management method according to an embodiment of this application.

FIG. 1 shows a possible scenario architecture of an access token management method according to an embodiment of this application. The scenario architecture includes a terminal and a server. Clients of a plurality of applications may be installed on the terminal. The applications may be classified into resource authorization applications and resource request applications based on a function in open authorization. The resource authorization application is specifically an application that has an open authorization function and can authorize another application to access a user resource of the resource authorization application. In other words, a user may log in to another application by using user information of a resource authorization application of the user. For example, applications such as Sina Weibo, WeChat, and Taobao all provide a software development kit (software development kit, SDK) that is used for performing the open authorization function. The resource request application may integrate the SDKs of the resource authorization applications in an application development phase, and perform configuration and work according to instructions, for example, apply for parameters such as an app ID and an app key from a server of the resource authorization application, to implement a capability that the resource request application initiates an OAuth 2.0 open authorization procedure to the server by calling the SDK. The resource request application is specifically an application that can access the user information of the resource authorization application after being authorized by the resource authorization application, and further perform a login by using the user information. The server is the server of the resource authorization application, and functions of the server include storing resources such as user information, granting another application permission to access the resources stored in the server, and verifying the permission granted by the server.

Figure 2:
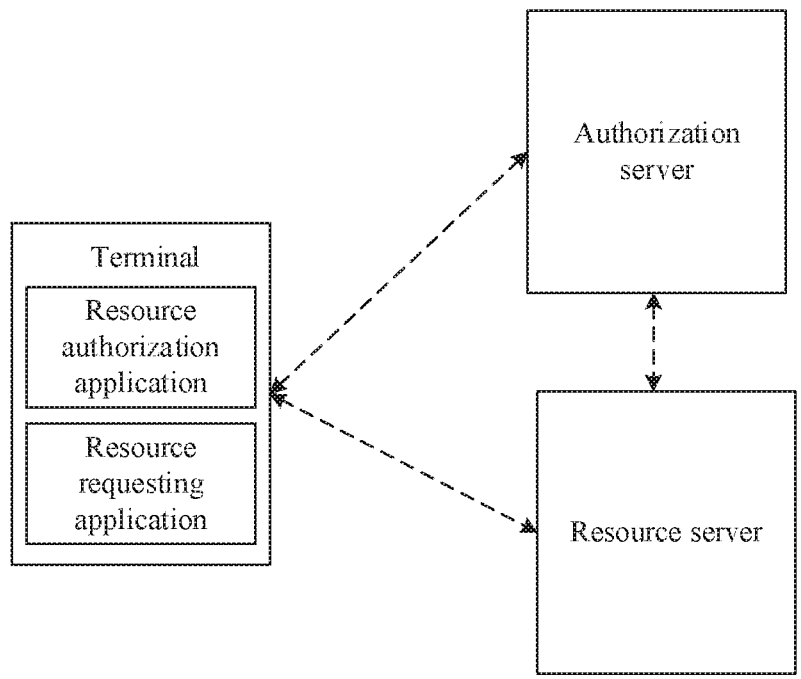
FIG. 2 shows an application architecture of another access token management method according to an embodiment of this application.

FIG. 2 shows another possible scenario architecture of an access token management method according to an embodiment of this application. The scenario architecture includes a terminal, an authorization server, and a resource server. Clients of a plurality of applications may be installed on the terminal. The applications may include a resource authorization application and a resource request application. The resource server is a resource storage server of the resource authorization application, and stores resources such as user information of the resource authorization application. The authorization server is an authorization server of the resource authorization application, and may authorize another application to access the resources in the resource server, and verify a resource access request, for example, an open authorization login request, initiated by the resource request application for using an access token.

Figure 3:
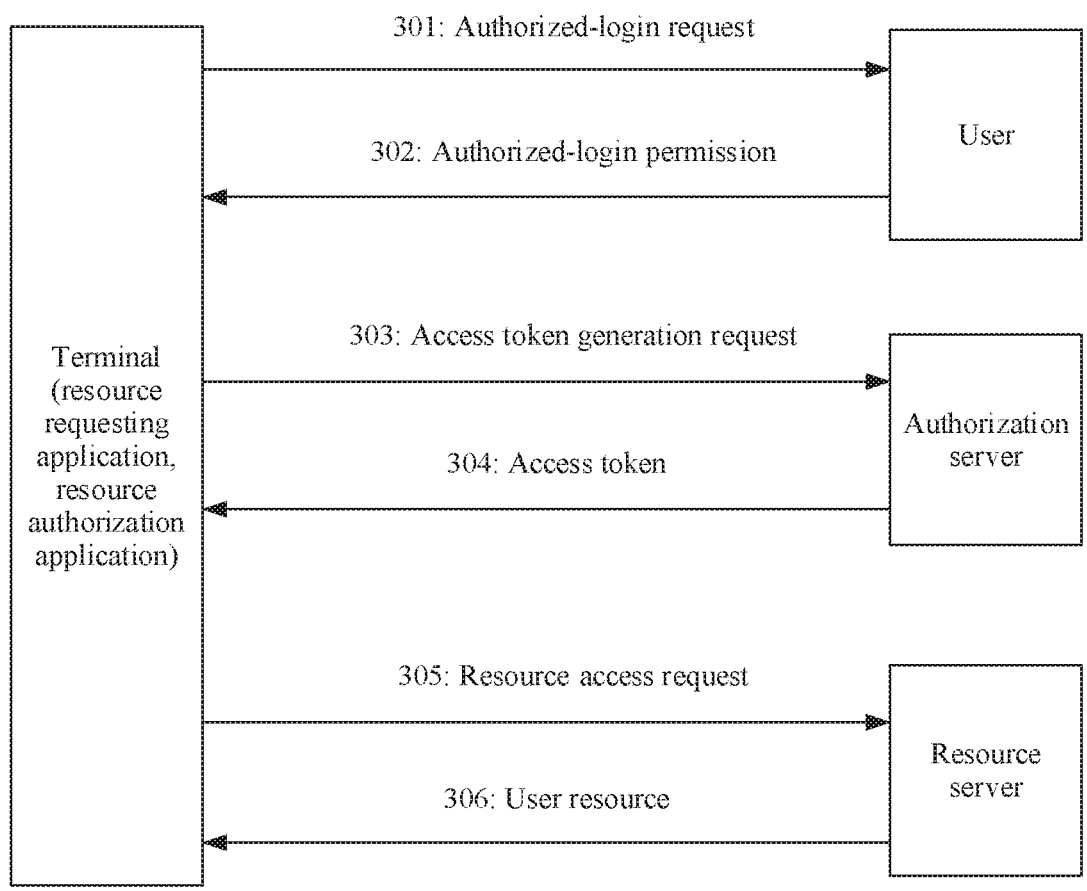
FIG. 3 is a schematic flowchart of an open authorization login according to an embodiment of this application.

FIG. 3 shows a possible process of accessing, by a resource request application, a protected user resource stored in a resource server of a resource authorization application, that is, performing an open authorization login to the resource request application by using the resource authorization application. The process includes the following steps.

Step 301: A terminal displays an authorized-login request. The terminal displays an authorized-login interface provided by the resource authorization application for the resource request application, and displays, to a user, information that is of the resource authorization application and that can be used, for example, an account or a nickname that is of the user and that is used for the resource authorization application, so as to log in to the resource request application, that is, displays the authorized-login request to the user.

Step 302: The terminal receives authorized-login permission. The user permits use of the information of the resource authorization application for logging in to the resource request application. The terminal receives a credential, generated by an authorization server, that is used to indicate that the user permits use of the information of the resource authorization application for logging in to the resource request application. The credential may be an authorization code.

Step 303: The terminal sends an access token generation request to the authorization server. With the login permission, the terminal may send the access token generation request to the authorization server of the resource authorization application, to request an access token that is used for enabling the resource request application to access the protected user resource in the resource server of the resource authorization application.

Step 304: The authorization server sends the access token to the terminal. The authorization server may authenticate an identity of the resource request application, verify the authorization code, and then send the access token to the terminal, to grant a client of the resource request application on the terminal permission to access the protected user resource in the resource server of the resource authorization application.

Step 305: The terminal sends a resource access request to the resource server. With the access token, the terminal may access the resource server of the resource authorization application by using the client of the resource request application, to request the protected user resource in the resource server.

Step 306: The resource server sends the user resource to the terminal. After the resource server of the resource authorization application verifies the authorization permission, the resource request application is enabled to access the resource.

It can be learned from a resource access process shown in FIG. 3 that the resource server of the resource authorization application can provide some protected user resources for the resource request application without exposing, to the resource request application, privacy information such as the account and a password that are of the user and that are used for the resource authorization application.

In an example, an example in which the resource authorization application is Sina Weibo (Weibo) is used to specifically describe the open authorization login. Sina Weibo may support an open authorization function that is based on the O-Auth 2.0 protocol, and allow the user to log in to another application by using a Sina Weibo account, for example, the resource request application. When the user logs in to the resource request application by using Sina Weibo, the resource request application may perform an open authorization login by calling an open authorization interface provided by Sina Weibo. After obtaining an access token, the resource request application may access and obtain protected basic resources such as a profile picture of the user and the nickname of the user in a resource server of Sina Weibo. In this way, it is implemented that with information of the Sina Weibo account, the user is automatically registered with the resource request application, and the basic user resources in the resource server of Sina Weibo are invoked, thereby simplifying an operation of logging in to the resource request application by the user, and improving user experience. It should be noted that actually, when the user logs in to the resource request application by using the Sina Weibo account, the resource request application generates, for the user, an account used for the resource request application, that is, automatically completes registration in the resource request application. This process generally does not require user awareness. In a case of a subsequent login, the user still performs an open authorization login to the resource request application by using an access token authorized by the Sina Weibo account.

Many large-scale applications such as WeChat (Wechat), Tencent QQ (Tencent QQ), Taobao (taobao), and Alipay (Alipay) also have a function similar to the open authorization login, and may be used as the resource authorization application to perform open authorization for the resource request application. The open authorization login is fast and convenient, and does not require the user to perform registration and memorize an account, a password, and the like when logging in to the resource request application, thereby reducing use of the account and the password, reducing a risk of an account and password leakage and the like, and improving security of using a network service by the user. Therefore, an increasing quantity of users choose to log in to the resource request application in an open authorization login manner.

Essence of the open authorization login is that based on that a user who passes identity verification agrees to perform authorization, the resource server of the resource authorization application provides user information to the resource request application for access. A credential for the open authorization login is an access token. The access token is verified each time there is a login to the resource request application, and is a credential necessary for a successful login of the user. The access token is a unique credential used for obtaining basic open information of the resource authorization application and calling a basic open function of the resource authorization application.

In an OAuth 2.0 standard, to prevent a man-in-the-middle attack, an access token leakage, and the like, a binding relationship between an access token and a terminal is enhanced in terms of security, for example, binding an access token to a terminal or binding an access token to a secure transport layer protocol (Transport Layer Security, TLS) connection between a terminal and a resource server. However, neither binding an access token to a user identity nor binding an access token to both a terminal identifier and a user identity is involved.

For example, a user A is an owner of the user resources in the resource authorization application. In step 301, if the terminal directly obtains information about a logged-in user account of the resource authorization application, in other words, in a case in which the terminal directly uses, as an identity certificate of the user A, a login account that is of the user A and that is used for the resource authorization application, the terminal can obtain the access token in step 303 after the user A completes permission granting. When an authorized account of the user A logs out, that is, the identity certificate of the user A in the terminal does not exist, because the access token is still retained on the terminal, the resource request application can still use the access token authorized by the user A for a login, consequently resulting in excessive use of the access token and permission granted by the user A. Currently, there is no relatively mature mechanism for reclaiming an access token and user-granted permission. Usually, it is only to wait for an access token to expire naturally, or the user deletes, in a manner of restoring a factory setting, formatting, or the like, an access token stored locally in the terminal, or an administrator of an authorization application cancels user-granted permission in a server of the authorization application by sending a specific instruction.

After the authorized account of the user A in the terminal logs out/logs out, the identity certificate of the user A in the terminal does not exist. In this case, the resource request application can still use the access token that represents the permission granted by the user A, to access the user information of the resource authorization application for logging in to the resource request application. This may result in damage to virtual property of the user A and a leakage of personal information of the user A.

For this scenario in which information of a logged-in account of the resource authorization application on the terminal is directly used as a user identity certificate for applying for an access token and performing an open authorization login, when an authorized account that is of the resource authorization application on the terminal and that has performed an open authorization login logs out, that a user can still log in to the resource request application by using the access token authorized by the authorized account may bring harm in the following scenarios:

1. A scenario in which a user lends a mobile phone. When lending the mobile phone temporarily, usually, the user logs out of only important applications such as a communication application and a payment application. Because an access token is retained in the mobile phone, the user can still log in to a resource request application.

2. A user logs in to WeChat and authorizes some applications on a family-shared tablet computer at night, and logs back in to WeChat on a mobile phone during the day. Although the user logs out of WeChat installed on the tablet computer, another user can still log in to resource requesting applications authorized by the user.

The harm caused may be as follows: damage to personal property such as a point coupon and game currency that are recharged in resource request applications (for example, game currency in a game application or a point coupon in a reading application), virtual property (for example, a gift from a live-content platform), a coupon, a movie coupon, and redeemable bonus points, and a leakage of personal privacy information such as a viewing record, an order, and a personalized configuration.

Specifically, for example, a mobile phone game application Wangzherongyao supports an open authorization login from WeChat/QQ. After the user A performs an open authorization login to Wangzherongyao by using a WeChat account a that is in a login state, Wangzherongyao obtains an access token user-granted by using the WeChat account A. For a subsequent login, the access token is used for an automatic login.

When the WeChat account a in the mobile phone logs out, regardless of by using an active operation or by being passively pushed out, a WeChat client on the terminal can no longer provide the identity certificate of the user A. However, in this case, when Wangzherongyao is started, a user can still log in to Wangzherongyao by using the access token authorized by the WeChat account a, and the access token authorized by the account a is still used. In this case, an operation performed on an account in Wangzherongyao cannot reflect a will of a holder (Resource Owner) of the original WeChat account a, that is, the user A, and may cause loss of virtual property of the user A.

It can be learned based on the foregoing content that after the resource authorization application authorizes the access token, the access token is stored in the terminal, so that when needed, the user can obtain/use the access token to initiate an open authorization login to the resource request application. Although open authorization brings a lot of convenience to a login to the resource request application by the user, after the user logs out of the resource authorization application, the terminal can still access the resources of the resource authorization application and log in to the resource request application by using the stored access token in the terminal, resulting in a leakage of the user information of the resource authorization application.

In view of the foregoing case, the embodiments of this application provide the following access token management method. According to the method, in scenarios such as that an authorized account logs out or that a resource authorization application is uninstalled, invalidation processing such as freezing, deleting, or access denying may be performed on an access token, so that a user can manage the access token in a manner of controlling the authorized account and/or the resource authorization application, thereby ensuring user information security.

When the resource authorization application is in a state in which an account logs in, when a terminal initiates the open authorization login shown in FIG. 3 by using a client of the resource authorization application, the currently logged-in account of the resource authorization application may be used for user authentication when an open authorization request is initiated. The open authorization request may also be referred to as an access token generation request. When open authorization is performed in a state in which the user logs in to the resource authorization application, the terminal can directly provide account information of the user as an identity certificate of the user. The account that logs in to the resource authorization application during open authorization may also be referred to as an authorized account of an applied-for access token. In this case, when a server is both an authorization server of the resource authorization application and a resource server of the resource authorization application, the server may bind the applied-for access token to the authorized account of the access token. When the authorization server of the resource authorization application and the resource server of the resource authorization application are not a same server, the authorization server may bind the applied-for access token, the terminal, and the authorized account together.

Figure 4:
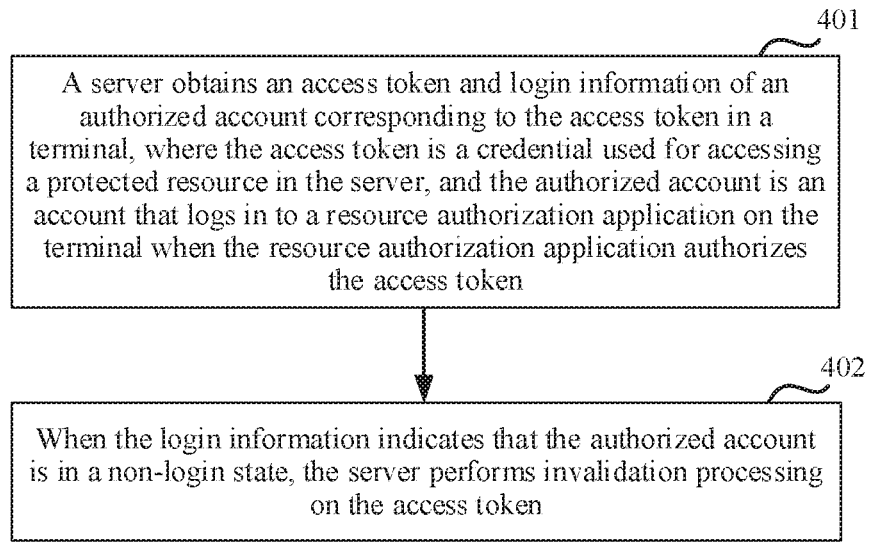
FIG. 4 is a schematic flowchart of an access token management method according to an embodiment of this application.

As shown in FIG. 4, an embodiment of this application provides an access token management method, including the following steps.

Step 401: A server obtains an access token and login information of an authorized account corresponding to the access token in a terminal, where the access token is a credential used for accessing a protected resource in the server, and the authorized account is an account that logs in to a resource authorization application on the terminal when the resource authorization application authorizes the access token.

The server may be a server that is of the resource authorization application and that has both a resource storage function and an open authorization function, or may be an authorization server that has an open authorization function.

The authorized account may be a login account when the resource authorization application is in a login state. The resource authorization application authorizes the access token that can be used for accessing a resource in the server of the resource authorization application.

The login information is information capable of indicating whether the authorized account logs in on the terminal, and may include information indicating that the account logs in on the terminal, or may include information indicating that the authorized account does not log in on the terminal. The login information may include information about that the account logs out of the resource authorization application, information about whether the resource authorization application is in a login state, information about whether the resource authorization application is uninstalled or deleted, and the like. If the resource authorization application is in the login state, the login information may further include information about a current login account of the resource authorization application. The information about the current login account of the resource authorization application may be alternatively used to represent a login status of the authorized account. For example, if the information about the current login account of the resource authorization application shows that the current login account of the resource authorization application is A, and the authorized account is also A, it can indicate that the authorized account A still logs in on the terminal; or if the information about the current login account of the resource authorization application shows that the current login account of the resource authorization application is B, it can indicate that the authorized account A already logs out of the terminal. If the resource authorization application is in a non-login state, that is, no account logs in to the resource authorization application, it indicates that the authorized account does not log in on the terminal. If the resource authorization application has been uninstalled or deleted, it also indicates that the authorized account does not log in on the terminal. The information about that the account logs out of the resource authorization application may include information about that the account actively logs out, or may include information about that the account is pushed out by another account. In this embodiment of this application, the information about that the account logs out of the resource authorization application may be referred to as logout information of the account.

Manners in which the server obtains the access token and the login information of the authorized account corresponding to the access token in the terminal may include the following.

In an example, when the server is a server with both a resource storage function and an open authorization function, the server may receive the access token sent by the terminal and the login information of the authorized account in the terminal. Specifically, when logging in to a resource request application, the terminal may send the access token and the login information of the authorized account in the terminal to the server. The terminal may alternatively send the access token and the login information of the authorized account in the terminal to the server at a predetermined time interval. The predetermined time interval may be determined based on an actual requirement. This is not limited in this application. The terminal may alternatively send the access token and the login information of the authorized account in the terminal to the server when being powered on.

Optionally, the server may receive the access token and a terminal identifier that are sent by the terminal, and the server obtains the login information based on the terminal identifier. The terminal identifier may be information that can identify the terminal, such as an IMEI, a MAC address, or a device certificate, or a hash value thereof. After obtaining the terminal identifier, the server may query a login status of a resource authorization application on a terminal corresponding to the terminal identifier, and further obtains login information. The login information includes an identifier of a current login account of the resource authorization application on the terminal.

In another example, when the server is the authorization server of the resource authorization application, the resource authorization application further has a resource server, and the resource server may be configured to store a resource such as user information of the resource request application. The resource server may receive the access token and the login information of the authorized account corresponding to the access token in the terminal from the terminal, and send the access token and the login information to the authorization server. Further, the authorization server can obtain the access token and the login information of the authorized account in the terminal.

Optionally, the resource server may receive the access token and a terminal identifier from the terminal, and the resource server obtains the login information based on the terminal identifier. The terminal identifier may be information that can identify the terminal, such as an IMEI, a MAC address, or a device certificate, or a hash value thereof. After obtaining the terminal identifier, the server may query a login status of a resource authorization application on a terminal corresponding to the terminal identifier, and further obtains login information.

In an example, when logging in to a resource request application by using the access token, the terminal may send a resource access request to the server. The resource access request may carry the access token and the login information. It should be noted that when logging in to the resource request application by using the access token, the terminal needs to request a user resource in the server of the resource authorization application, so as to log in to the resource request application by using the requested user resource. In this case, the terminal needs to send the resource access request to a server of the resource request application.

Optionally, before step 401, the method further includes: receiving, by the server, an access token generation request from the terminal. The access token generation request includes an identifier of the authorized account; and the server generates the access token based on the access token generation request, and establishes a matching relationship between the access token and the authorized account based on the identifier of the authorized account. The identifier of the authorized account may include a hash value of a user account, a name of a user account, a user nickname, a randomly generated code, and the like. The identifier of the authorized account may be used to distinguish between different authorized accounts. When the authorized account of the resource authorization application logs in, with a user's permission, the access token generation request sent by the terminal to the server includes a user identity and an authorization code indicating the user's permission. The user identity is represented by an authorized account identified by an authorized account identifier. After verifying the user identity and the authorization code, the server may generate the access token. The server may use the authorized account identifier as a parameter for generating the access token, or establish the matching relationship between the access token and the authorized account in a manner such as recording a mapping relationship.

Step 402: When the login information indicates that the authorized account is in a non-login state, the server performs invalidation processing on the access token.

When the current login account of the resource authorization application does not match the authorized account, the resource authorization application is in a non-login state, or the resource authorization application is deleted or uninstalled, it indicates that the authorized account corresponding to the access token is in a non-login state on the terminal holding the access token. In this case, the server performs invalidation processing on the access token. In this embodiment of this application, invalidation processing may also be referred to as restricting. To be specific, performing invalidation processing on the access token may also be referred to as restricting the access token.

Performing invalidation processing on the access token may include: The server may delete the access token stored on a server side or open authorization information related to the access token; or the server may freeze the access toke or open authorization information related to the access token, and trigger sending of a notification to the terminal, so that the terminal no longer continues to use the access token until the user re-logs in by using the authorized account to perform (may be performed automatically) an unfreezing operation or re-initiates an open authorization login to perform an unfreezing operation; or the server may add a specific label to the access token. Specifically, the server adds a description of the access token in an access token storage area, and the description is used to indicate that the authorized account corresponding to the access token already logs out of the terminal. When the terminal accesses a resource of the resource authorization application by using the access token for logging in to a resource request application, the server or the resource server learns, based on the specific label of the access token, that the authorized account of the access token already logs out of the terminal, and therefore rejects a resource access request and/or a login request that are/is initiated by the access token, so as to deny access to a user resource in the server or the resource server. The open authorization information includes the authorized account identifier that matches the access token, and some existing mandatory information of an open authorization login, for example, a validity period of the access token.

It should be noted that in this application, the login information used to indicate that the authorized account is in the non-login state may be in a plurality of forms, including but not limited to any one of the following pieces of information: The current login account of the resource authorization application is different from the authorized account, no account logs in to the resource authorization application, the resource authorization application has been uninstalled from the terminal, and the like.

In an example, the performing, by the server, invalidation processing on the access token includes: determining, by the server based on the matching relationship between the access token and the authorized account, whether the current login account matches the access token and when the current login account does not match the access token, that is, the current login account is not the authorized account of the access token, performing, by the server, invalidation processing on the access token.

According to the access token management method provided in this embodiment of this application, corresponding processing may be performed on the access token based on the login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Next, the following specifically describes the access token management method provided in the embodiments of this application. In this embodiment, a client of a resource request application is installed on a terminal, and a resource authorization application has a resource server and an authorization server.

In this embodiment of this application, when generating an access token, the authorization server establishes an association relationship with an authorized account, specifically as follows.

The terminal adds an identifier of a current login account of the resource authorization application to a sent access token request. After performing a process of authenticating an identity of the resource request application and verifying an authorization code, when generating the access token, the authorization server associates the access token with the identifier of the current login account. The current login account is an authorized account of the access token.

A specific method for associating the access token with the authorized account by the authorization server may be as follows: generating, by the authorization server, an authorized account identifier used for distinguishing between different user accounts. The authorized account identifier may be in a form of a hash value of a user account, a user account, a user nickname, a randomly generated code, or the like, and is used only for distinguishing purposes. A correspondence between the authorized account identifier and the authorized account is unique on a side of the authorization server. In an example, the authorized account identifier may exist in a form of a public key and a private key. A terminal side performs digital signing on specified data by using the private key, and uses the digital signature as proof that the authorized account is in a login state. The public key is stored in the server, and is used to verify a signature generated by using the private key. The authorization server may use the authorized account identifier as a parameter for generating the access token, or establish the association relationship between the access token and the authorized account in a manner such as recording a mapping relationship.

After generating the access token and establishing the association relationship between the access token and the authorized account, the server may send the access token to the terminal. Optionally, the server may send the authorized account identifier of the access token together with the access token. After receiving the access token and the authorized account identifier, the terminal may register an association relationship between the access token and the authorized account identifier in a system. The terminal may access a user resource in the resource server of the resource authorization application by using the access token, for logging in to the resource request application.

Figure 5:
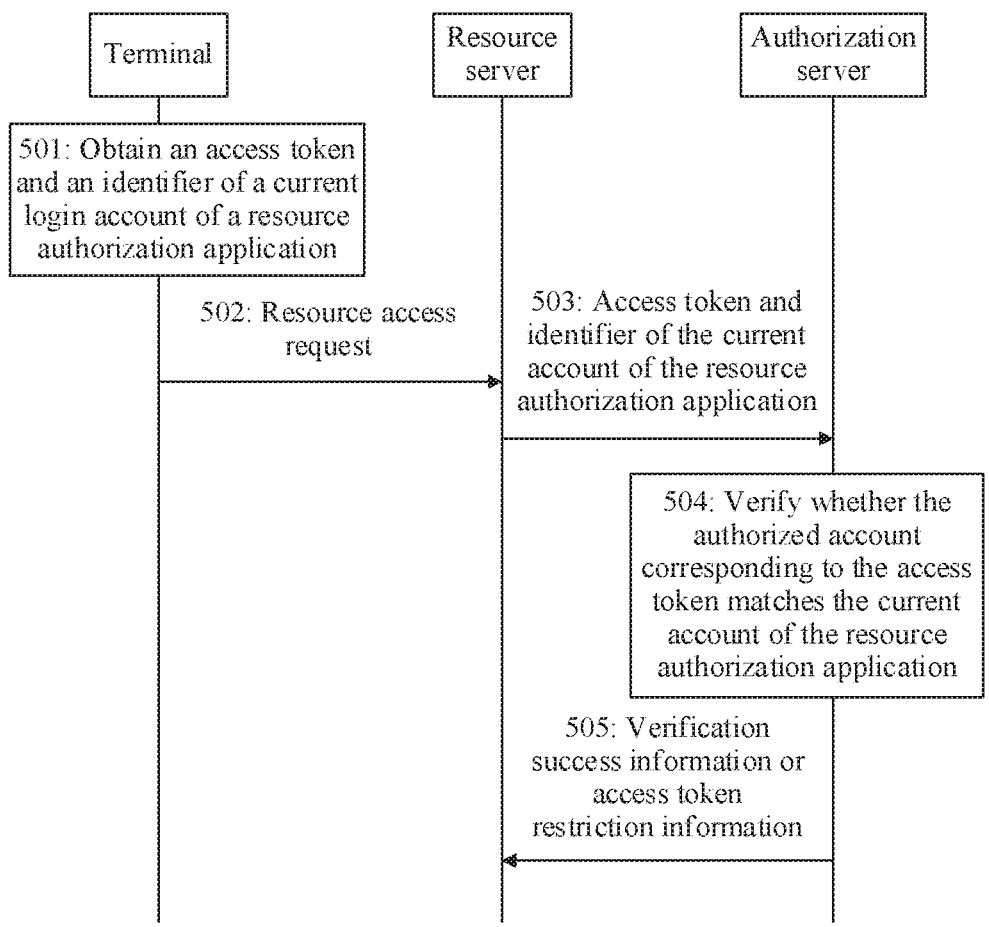
FIG. 5 is a schematic flowchart of an access token management method according to an embodiment of this application.

In this embodiment of this application, a specific process of managing the access token by the authorization server is shown in FIG. 5.

Step 501: The terminal obtains the access token and the identifier of the current login account of the resource authorization application.

Step 501 may include the following implementations.

a. The client of the resource request application on the terminal may record in advance a resource authorization application that performs open authorization for the resource request application. When attempting to initiate a login to the resource request application, the terminal determines, based on a recorded open authorization relationship, the resource authorization application corresponding to the resource request application to which the terminal attempts to log in, and may query a current login account of the resource authorization application or an identifier of the current login account from the resource authorization application by using an interface provided by the resource authorization application. In this embodiment of this application, the current login account of the resource authorization application may also be referred to as a current account of the resource authorization application.

b. The resource authorization application on the terminal registers, in an authorization relationship recording module of the system, a resource request application for which the resource authorization application has performed open authorization. When the terminal attempts to initiate a login to the resource request application, the client of the resource request application queries, from the authorization relationship recording module of the system by using an interface provided by the system, information about a current login account of the resource authorization application that performs open authorization for the resource request application. The authorization relationship recording module of the system determines, based on an open authorization relationship recorded by the authorization relationship recording module, the authorization application corresponding to the resource request application and the current login account of the resource authorization application, and returns an identifier of the current login account to the resource request application. It should be noted that the system in the terminal may record and store information about an authorization relationship between the resource authorization application and the resource request application; and a module may be provided in the system, to perform unified management on information that is about authorization relationships between resource authorization applications and resource request applications and that is recorded and stored by the system, and the resource authorization applications and the resource request applications may alternatively register the authorization relationships between them with the module. In this embodiment of this application, the module is referred to as the authorization relationship recording module.

A possible format of the open authorization relationship recorded by the authorization relationship recording module is as follows: (resource request application: A, authorization application: B, identifier of a current account of the authorization application: 1).

Step 502: The terminal sends a resource access request to the resource server. The resource access request includes the access token and the identifier of the current account of the resource authorization application on the terminal.

Step 503: The resource server sends the access token and the identifier of the current account of the resource authorization application to the authorization server.

Step 504: The authorization server verifies whether the authorized account corresponding to the access token matches the current account of the resource authorization application.

As described above, when generating the access token, the authorization server binds the access token and the authorized account corresponding to the access token together. The authorization server stores a binding relationship between the access token and the authorized account corresponding to the access token. After receiving the access token, the authorization server may determine, based on the binding relationship, the authorized account corresponding to the access token, and then performs matching between the determined authorized account and an account corresponding to the received identifier of the current account of the resource authorization application. If the determined authorized account matches the account corresponding to the received identifier of the current account of the resource authorization application, the authorization server sends verification success information to the resource server. If the determined authorized account does not match the account corresponding to the received identifier of the current account of the resource authorization application, the authorization server performs invalidation processing on the access token, and sends access token invalidation information to the resource server, so that the resource server denies access initiated by using the access token. From a perspective of the server, if the authorized account corresponding to the access token and the current login account of the resource authorization application on the terminal are not a same account, it indicates that a current operator of the terminal and an operator applying for the access token are not a same user. The current resource access request initiated by the terminal by using the access token is denied, so as not to cause loss to the user.

Performing, by the authorization server, invalidation processing on the access token may be specifically: deleting the access token or deleting open authorization information that is related to the access token and that is stored on a server side; or freezing the access toke, and sending a notification to the terminal, so that the terminal no longer continues to use the access token; or adding a specific label to the access token. When the terminal accesses a resource of the resource authorization application by using the access token for logging in to a resource request application, the server or the resource server rejects, based on the specific label, a resource access request/login request initiated by the access token.

Step 505: Send the verification success information or access token restriction information to the resource server. The access token restriction information may be information indicating that the access token has been invalidated and can no longer be used. If receiving the verification success information, the resource server allows the terminal to access a resource stored in the resource server. If receiving the access token restriction information, the resource server denies access from the access token.

In this embodiment of this application, an alternative solution of step 501 and step 502 is further provided, and is specifically: The terminal submits the access token and a terminal identifier to the resource server by using the resource request application, so that the resource server searches for the current login account of the resource authorization application on the terminal based on the terminal identifier, and obtains the identifier of the current login account.

In an example, when the identifier of the current login account exists in a form of a public key and a private key, a client of the resource authorization application or the system in the terminal performs digital signing on specified data, and sends the signature as the identifier of the current login account to the resource request application. Each account of the resource authorization application corresponds to a private key. When an account logs out, a private key corresponding to the account is not allowed to be used. The authorization server verifies, by using a public key associated with the access token, a signature sent by the resource server. If the signature passes verification, it indicates that the current login account of the resource authorization application on the terminal matches the authorized account associated with the access token.

It should be noted that in this embodiment of this application, that the server side includes the resource server and the authorization server is an application scenario of the access token management method provided in this application. If there is only one type of server on the server side, that is, the server has functions of both the authorization server and the resource server, the foregoing steps may be interactions within the server.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 6:
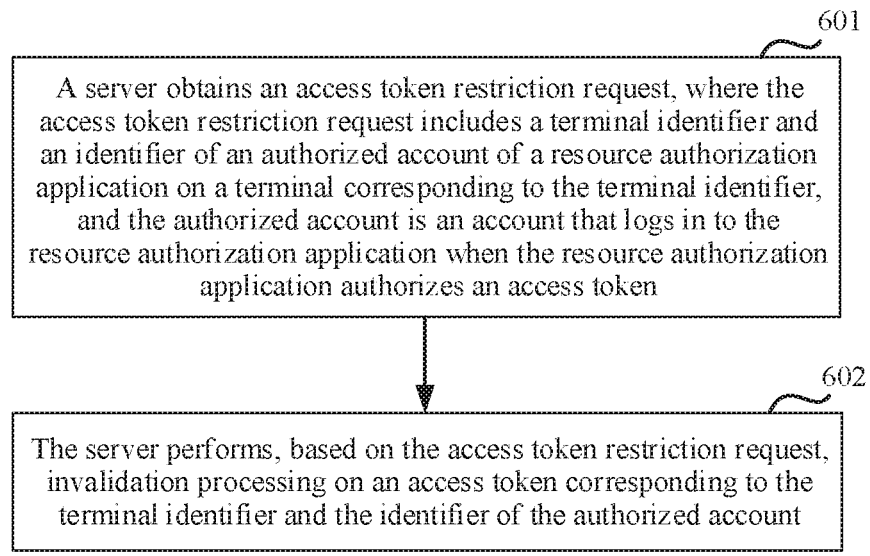
FIG. 6 is a schematic flowchart of an access token management method according to an embodiment of this application.

The embodiments of this application further provide an access token management method. As shown in FIG. 6, the method includes the following steps.

Step 601: A server obtains an access token restriction request, where the access token restriction request includes a terminal identifier and an identifier of an authorized account of a resource authorization application on a terminal corresponding to the terminal identifier, and the authorized account is an account that logs in to the resource authorization application when the resource authorization application authorizes an access token.

The access token restriction request may be used to request the server to perform invalidation processing on the access token. The terminal identifier and the identifier of the authorized account that are included in the access token restriction request are used for the server to recognize the access token that needs to be invalidated.

Manners in which the server obtains the access token restriction request may include the following.

In an example, when the server is a server with both a resource storage function d an open authorization function, the server may receive the access token restriction request sent by the terminal. Specifically, the terminal may detect a change in a login account of the resource authorization application installed on the terminal. For example, the terminal may query information about the login account of the resource authorization application, to check whether the login account of the resource authorization application changes. When finding, through querying, that the authorized account logs out of the resource authorization application, the terminal may proactively send the access token restriction request to the server. Alternatively, the terminal may display a sending confirmation interface of the access token restriction request, and then, a user chooses whether to send the access token restriction request. When receiving an operation instruction of confirming sending of the access token restriction request, the terminal sends the access token restriction request to the server. When the resource authorization application is uninstalled from the terminal, the terminal may proactively send the access token restriction request to the server; or may display a sending confirmation interface of the access token restriction request, and when receiving a confirmation operation instruction, sends the access token restriction request to the server.

In an example, when the server is an authorization server of the resource authorization application, the resource authorization application further has a resource server. The resource server may query a change in a login account of the resource authorization application on the terminal. For example, when an account of the resource authorization application on the terminal logs out, the resource server can perceive the logout, regardless of whether a user proactively logs out of the account or the account is pushed out. Therefore, when finding, through querying, that an account of the resource authorization application on a terminal logs out, the resource server synchronously sends, to the authorization server, an access token restriction request intended for the account on the terminal. Specifically, for example, an account C logs in to a resource authorization application B on a terminal A. When the account C logs out of the resource authorization application B, a resource server of the resource authorization application B may perceive that the account C on the terminal A logs out, and synchronously send, to an authorization server of the resource authorization application B, a restriction request intended for an access token authorized by the account C on the terminal A.

Optionally, before step 601, when the resource authorization application on the terminal performs open authorization for a resource request application, with a user's permission, the terminal sends an access token generation request to the server. The access token generation request includes the terminal identifier, the identifier of the authorized account, and an authorization code indicating the user's permission. The identifier of the authorized account represents a user identity. The server verifies the user identity and the authorization code, and generates the access token. When generating the access token, the server may use the identifier of the authorized account and the terminal identifier as a parameter for generating the access token, to establish a matching relationship between the generated access token and the authorized account and a matching relationship between the generated access token and the terminal; or establish a matching relationship between the access token and the authorized account and a matching relationship between the access token and the terminal in a manner of recording a mapping relationship.

Step 602: The server performs, based on the access token restriction request, invalidation processing on an access token corresponding to the terminal identifier and the identifier of the authorized account.

A same authorized account may authorize a plurality of access tokens on different terminals. After receiving the access token restriction request, the server extracts the terminal identifier and the identifier of the authorized account that are in the access token restriction request, then queries the access token corresponding to the terminal identifier and the identifier of the authorized account, and then performs invalidation processing on the access token.

Invalidation processing may be specifically: deleting the access token or deleting open authorization information that is related to the access token and that is stored on a server side; or freezing the access Coke, and sending a notification to the terminal, so that the terminal no longer continues to use the access token; or adding a specific label to the access token. When the terminal accesses a resource of the resource authorization application by using the access token for logging in to a resource request application, the server or the resource server rejects, based on the specific label, a resource access request/login request initiated by the access token.

In an example, after performing invalidation processing on the access token, the server may further send restriction information of the access token to the terminal corresponding to the terminal identifier. After being invalidated, the access token can be restored or unfrozen by a re-login of the authorized account on the terminal. To be specific, after the authorized account logs in again on the terminal, the invalidated access token can become valid again, and can be used again. After receiving the restriction information of the access token, the terminal may prompt the user to restore the access token by using the authorized account. Specifically, the terminal may display a prompt of unfreezing the access token by using the authorized account.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Next, the following specifically describes the access token management method provided in the embodiments of this application. In this embodiment, a client of a resource request application is installed on a terminal, and a resource authorization application has a resource server and an authorization server.

In this example, when generating an access token, the authorization server establishes an association relationship between the access token and an authorized account and a terminal identifier, specifically as follows.

An access token generation request sent by the terminal to the authorization server includes the terminal identifier and an identifier of a current login account of the resource authorization application on the terminal. The terminal identifier may be information that can identify the terminal, such as an IMEI, a MAC address, or a device certificate, or a hash value thereof. In a process of authenticating an identity of the resource request application and verifying an authorization code, the authorization server determines whether the terminal directly uses, as a user identity certificate, user information corresponding to an account that is of the resource authorization application and that is in a login state. If the terminal directly uses, as the user identity certificate, the user information corresponding to the account that is of the resource authorization application and that is in the login state, when generating the access token, the authorization server associates the access token with the account and the terminal identifier. The account is an authorized account of the access token.

Figure 7:
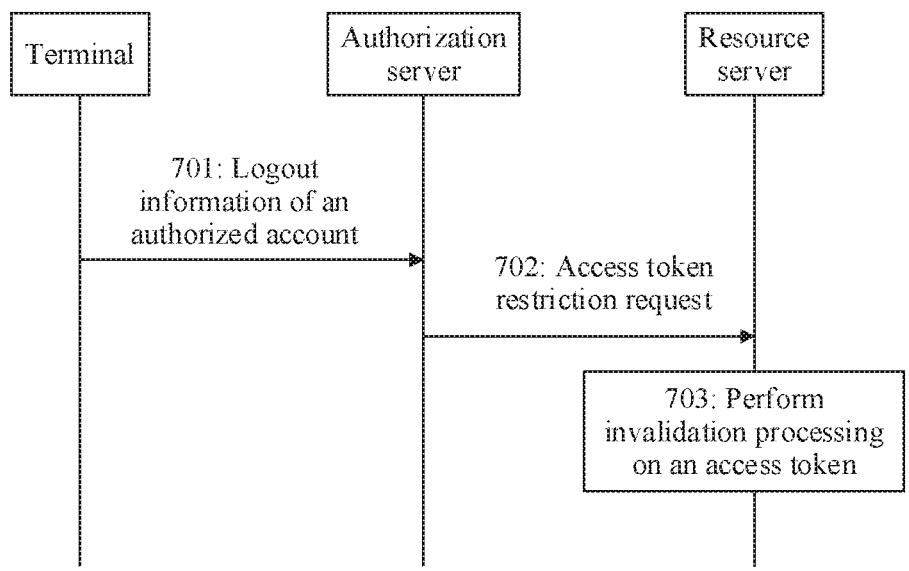
FIG. 7 is a schematic flowchart of an access token management method according to an embodiment of this application.

In this embodiment of this application, a specific process of managing the access token by the authorization server is shown in FIG. 7.

Step 701: The terminal sends logout information of the authorized account to the resource server. When the authorized account of the resource authorization application on the terminal logs out, the terminal may send the logout information of the authorized account to the resource server, regardless of whether the account proactively logs out or is pushed out. Therefore, when receiving logout information of an authorized account of a resource authorization application on a terminal, the resource server may send, to the authorization server, an access token restriction request intended for the authorized account on the terminal. The resource server may send the access token restriction request automatically, or may send the access token after obtaining an indication of sending the access token restriction request. For example, when a user proactively exits the authorized account, the user may choose whether to allow the resource server to send the access token restriction request. A specific implementation form may be: The user sends an access token restriction instruction to the resource server by using the terminal, to instruct the resource server to initiate the access token restriction request.

Step 702: The resource server sends the access token restriction request to the authorization server. The access token restriction request includes the terminal identifier and an identifier of the authorized account. The access token restriction request may be specifically an access token freezing request, which is used to request the authorization server to freeze a corresponding token. The access token freezing request is a specific implementation form of the access token restriction request described above.

Step 703: The authorization server performs invalidation processing on the access token. After receiving the access token restriction request, the authorization server determines the access token based on the terminal identifier and the identifier of the authorized account that are in the access token restriction request and based on the association relationship between the terminal identifier, the authorized account, and the access token, and then performs invalidation processing on the determined access token. When the access token restriction request is specifically an access token freezing request, invalidation processing performed by the authorization server on the access token is specifically freezing the access token.

Optionally, after step 703, when the terminal needs to re-log in to the resource request application by using the access token, the terminal prompts the user to perform an activation or re-authorization operation. Specifically, the terminal may prompt the user to log in to the resource authorization application by using the authorized account, to activate the invalidated access token or re-authorize an access token.

Optionally, after step 703, the authorization server may send restriction information of the access token directly to the terminal, or send restriction information of the access token to the terminal by using the resource server. After receiving the restriction information of the access token, the terminal may prompt the user that the access token authorized by the authorized account is invalidated, and may further prompt the user to re-log in to the authorized account from the resource authorization application. In an example, the terminal may further display an interface prompting the user to log in to the authorized account.

It should be noted that in this embodiment of this application, that a server side includes two resource servers and the authorization server is an application scenario of the access token management method provided in this application. If there is only one type of server on the server side, that is, the server has functions of both the authorization server and the resource server, the foregoing steps may be interactions within the server.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 8:
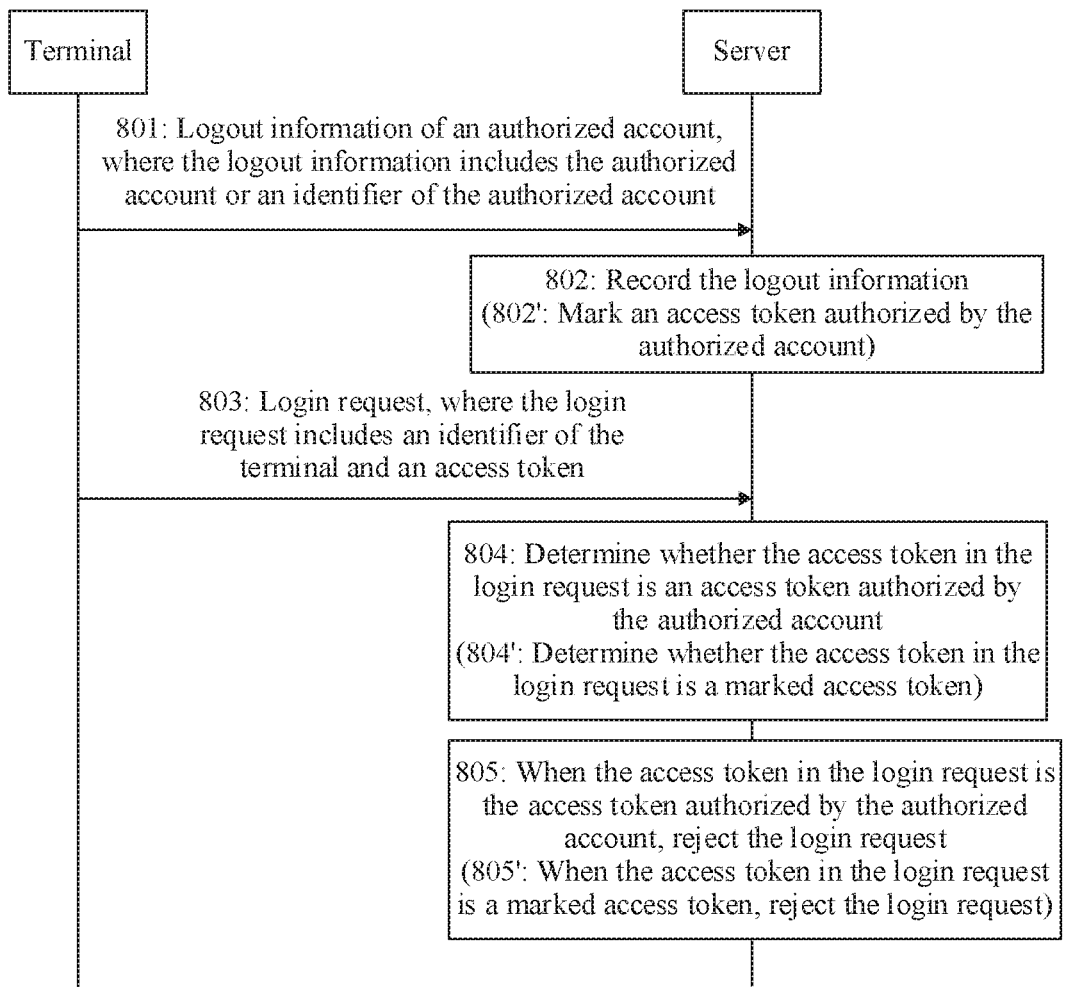
FIG. 8 is a schematic flowchart of an access token management method according to an embodiment of this application.

The embodiments of this application further provide an access token management method. As shown in FIG. 8, the method includes the following steps.

Step 801: A terminal sends logout information of an authorized account to a server, where the logout information includes the authorized account or an identifier of the authorized account.

Specifically, when finding, through querying, that an authorized account of a resource authorization application logs out (the authorized account proactively logs out, or the authorized account is pushed out by another account), the terminal may send logout information of the authorized account to the server.

Step 802: The server records the logout information.

After receiving the logout information of the authorized account, the server records that the authorized account in the logout information or an authorized account identified by the identifier of the authorized account in the logout information is in a non-login state on the terminal.

Step 803: The terminal sends a login request to the server, where the login request includes an identifier of the terminal and an access token.

Specifically, when initiating a login to a resource request application, the terminal sends the login request to the server, to request to use a user resource in the server for logging in to the resource request application, where the login request carries the identifier of the terminal and the access token.

Step 804: The server determines whether the access token in the login request is an access token authorized by the authorized account.

Specifically, after receiving the login request, the server queries, based on the access token in the login request, an account authorizing the access token, and determines whether the account authorizing the access token is the authorized account, that is, determines whether the access token is the access token authorized by the authorized account.

Step 805: When the access token in the login request is the access token authorized by the authorized account, the server rejects the login request.

Specifically, the server may first query, based on the identifier of the terminal in the login request, the logout information of the terminal corresponding to the identifier of the terminal from logout information that is of a plurality of terminals and that is recorded by the server. When the access token in the login request is the access token authorized by the authorized account in the logout information found through querying based on the identifier of the terminal, the server rejects the login request sent by the terminal, so that the terminal cannot use the user resource in the server for logging in to the resource request application.

For example, in this embodiment of this application, when finding, through querying, that an authorized account A logs out of a resource authorization application, a terminal a sends logout information of the authorized account A to a server. After receiving the logout information of the authorized account A, the server records that the authorized account A is in a non-login state on the terminal a. When finding, through querying, that an authorized account B logs out of a resource authorization application, a terminal b sends logout information of the authorized account B to the server. After receiving the logout information of the authorized account B, the server records that the authorized account B is in a non-login state on the terminal b. After receiving a login request that includes an access token and a terminal identifier of the terminal a, the server finds, in a database through querying based on the terminal identifier of the terminal a, information that is that the authorized account A is in a non-login state on the terminal a and that is recorded by the server, and determines that the authorized account corresponding to the access token in the login request is the account A. Because the server records that the account A on the terminal a is in a non-login state on the terminal, the server denies access of the login request to the protected user resource in the server. To be specific, after learning that the authorized account A is in a non-login stale on the terminal, the server does not immediately process the access token authorized by the authorized account A, and instead, after subsequently receiving the login request that uses the access token, denies access of the login request to the resource based on the non-login state that is of the authorized account A on the terminal and that is recorded by the server.

Optionally, in this embodiment of this application, an alternative solution of step 802, step 804, and step 805 is further provided, and is specifically as follows.

Step 802': The server marks an access token authorized by the authorized account.

After receiving the logout information, the server queries, based on the authorized account or the identifier of the authorized account in the logout information, the access token authorized by the authorized account, and then marks the access token. Marking may be adding a specific label to the access token. The label is used to prompt the server that the authorized account corresponding to the access token is in a non-login stale on the terminal.

Step 804': The server determines whether the access token in the login request is a marked access token.

Specifically, after receiving the login request, the server determines whether the access token in the login request is an access token marked in the server. After the server authorizes the access token, the server stores the access token and sends the access token to the terminal. Therefore, both the server and the terminal have the same access token. The server receives the access token sent by the terminal, matches the access token with the access token stored by the server, and finds, through querying, that the access token stored by the server and the access token received by the server are the same access token.

Step 805': When the access token in the login request is a marked access token, the server rejects the login request.

Specifically, if the access token that is stored in the server and that corresponds to the access token in the login request is marked by the server, it indicates that the authorized account of the access token is in a non-login state on the terminal. The server rejects the login request sent by the terminal, so that the terminal cannot use the user resource in the server for logging in to the resource request application.

For example, in this embodiment of this application, when finding, through querying, that an authorized account A logs out of a resource authorization application, a terminal sends logout information of the authorized account A to a server. After receiving the logout information of the authorized account A, the server marks an access token authorized by the account A. After receiving a login request that includes an access token and a terminal identifier, because a same access token in the server is marked in the server, the server denies access of the login request to a user resource. To be specific, after the authorized account A logs out, the server does not immediately process the access token authorized by the authorized account A, and instead, marks the access token, so as to deny access of the login request to the resource after subsequently receiving the login request that uses the access token.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 9:
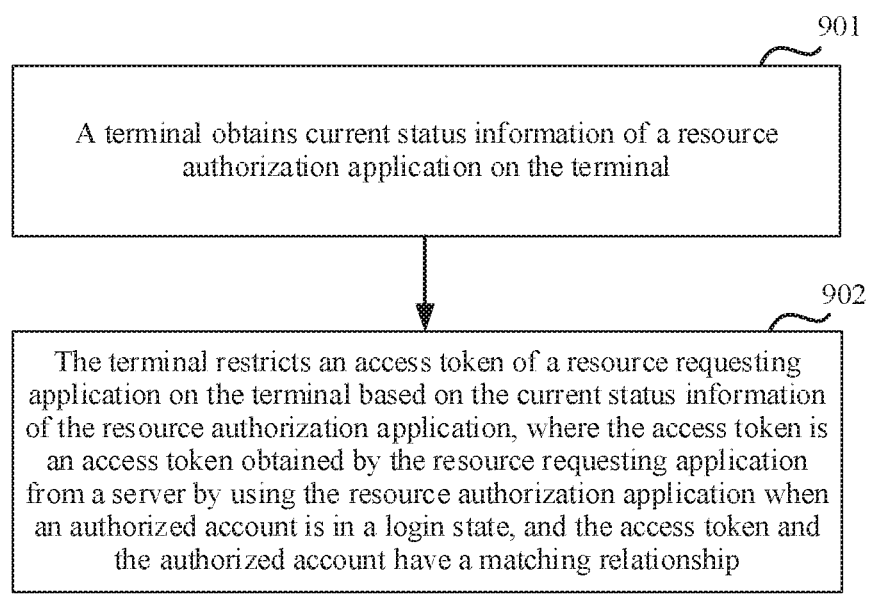
FIG. 9 is a schematic flowchart of an access token management method according to an embodiment of this application.

The embodiments of this application further provide an access token management method, which is applied to a terminal. The terminal includes a resource request application. A resource authorization application has performed open authorization for the resource request application. The resource request application has an access token used for accessing a protected user resource in a server of the resource authorization application. As shown in FIG. 9, the method includes the following steps.

Step 901: A terminal obtains current status information of a resource authorization application on the terminal.

The terminal may query a current status of the resource authorization application on the terminal when a client of the resource request application initiates an authorized login, that is, initiates a login to the resource request application by using an access token, to obtain the current status information of the resource authorization application. The terminal may alternatively query, within a user-preset period or a factory-set period, current statuses of resource authorization applications corresponding to access tokens, to obtain current status information.

The current status information of the resource authorization application is used to indicate a current status of the resource authorization application. The current status of the resource authorization application may include a login state of an authorized account and a non-login state of the authorized account. Specifically, current status information indicating the non-login state of the authorized account may be that a current login account of the authorization application is not the authorized account, or may be that the authorized account logs out of the resource authorization application, or may be that the resource authorization application is deleted.

Step 902: The terminal restricts an access token of a resource request application on the terminal based on the current status information of the resource authorization application, where the access token is an access token obtained by the resource request application from a server by using the resource authorization application when the authorized account is in a login state, and the access token and the authorized account have a matching relationship. The terminal has the matching relationship between the access token and the authorized account. When the current status information of the resource authorization application indicates that the current status of the resource authorization is the non-login state of the authorized account, the terminal restricts the access token based on the matching relationship.

That the terminal restricts the access token may also be referred to as that the terminal performs invalidation processing on the access token.

In an example, that the terminal restricts the access token of the resource request application on the terminal based on the current status information of the resource authorization application may be that the terminal denies extracting of the access token by the resource request application. Specifically, when the resource authorization application on the terminal performs open authorization for the resource request application, the terminal may record an account that logs in to the resource authorization application during open authorization, that is, the matching relationship between the authorized account and the access token obtained through open authorization. More specifically, a system in the terminal has a unified account management module. A client of the resource authorization application or the client of the resource request application may further register the access token, an identifier of the authorized account, and the matching relationship between the access token and the authorized account with the unified account management module. The client of the resource authorization application may register information about the current login account of the resource authorization application with the system. The unified account management module provides a query interface. The client of the resource request application may register a storage location of the access token with the unified account management module, and the system sets a corresponding access policy for the access token. The access policy is that the access token associated with the authorized account is allowed to be accessed and extracted only when the current login account of the resource authorization application is the same as the authorized account. Therefore, when the resource authorization application is in the non-login state of the authorized account, the resource request application cannot extract the access token.

In an example, that the terminal restricts the access token of the resource request application on the terminal based on the current status information of the resource authorization application may alternatively be deleting the access token. Optionally, when the current status information indicates that the resource authorization application is in the non-login state of the authorized account, the terminal may automatically delete the access token based on the matching relationship between the authorized account and the access token.

Optionally, when the current status information indicates that the resource authorization application is in the non-login state of the authorized account, the unified account management module in the system in the terminal may provide a user management interface, to display the access token matching the authorized account, and a user manually deletes the access token. Further, the unified account management module may adjust displayed content based on a change in an account login status of the resource authorization application. For example, when a resource authorization application A has performed open authorization for a resource request application a by using accounts B1 and B2, and when an account logging in to the resource authorization application switches from B1 to B2, only an open authorization relationship between the account B1 and the resource request application a and a management interface of a corresponding access token are displayed.

Figure 10:
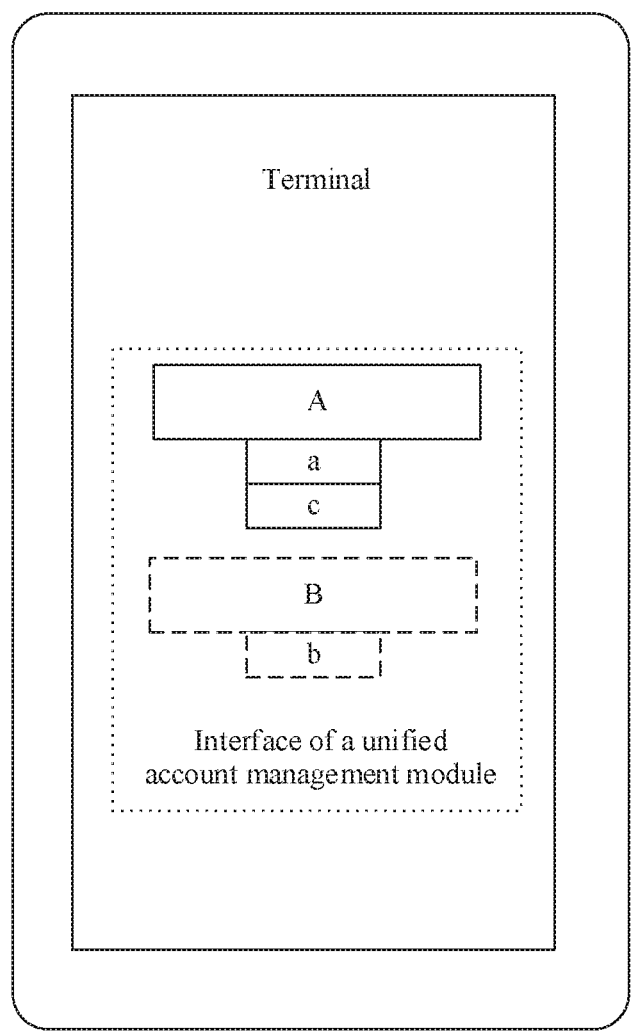
FIG. 10 is an effect display diagram of an access token management method according to an embodiment of this application.

Optionally, the terminal may display an interface of the unified account management module. The interface displays a resource authorization application, and a resource request application for which the resource authorization application has performed open authorization. When an authorized account logs out of the resource authorization application, a user may manually delete an access token of the resource request application corresponding to the authorized account. Specifically, for example, as shown in FIG. 10, on the terminal, a resource authorization application A performs open authorization for resource request applications a and c, and a resource authorization application B performs open authorization for a resource request application b. When an authorized account of the resource authorization application A corresponding to the resource request applications a and c logs out, the terminal may display an interface shown in FIG. 10, so that a user can enter, by touching an icon of the resource request application a and/or an icon of the resource request application c, a storage path of an access token corresponding to the resource request application a and/or a storage path of an access token corresponding to the resource request application c, so as to perform an operation on the access token such as deletion.

In an example, that the terminal restricts the access token of the resource request application on the terminal based on the current status information of the resource authorization application may be that the terminal freezes the method token. Specifically, when the current status information indicates that the resource authorization application is in the non-login state of the authorized account, the terminal may freeze the access token. For example, the terminal may freeze permission to access a storage address of the access token. In this example, when the authorized account re-logs in to the resource authorization application, the terminal may unfreeze the permission to access the storage address of the access token.

The matching relationship between the access token and the authorized account may be specifically a matching relationship between the access token and the identifier of the authorized account. The identifier of the authorized account may be in a form of a hash value of the authorized account, the authorized account, a user nickname, a randomly generated code, or the like, and is used only for distinguishing purposes. A format in which the matching relationship is recorded may be: (access token, identifier of the authorized account).

The matching relationship between the access token and the authorized account in the terminal may be a matching relationship recorded by the terminal, or may be a matching relationship obtained by the terminal from the server.

Next, the following specifically describes how the terminal records the matching relationship between the access token and the authorized account. The resource authorization application performs open authorization for the resource request application on the terminal. When the terminal obtains the access token, the terminal may establish the matching relationship between the authorized account and the access token, or may associate the resource authorization application with the resource request application and record an association relationship. The authorized account is an account that logs in to the resource authorization application when the resource authorization application performs open authorization.

More specifically, the client of the resource request application on the terminal may record the resource authorization application that performs open authorization for the resource request application. The client of the resource authorization application may record an identifier of the login account, that is, the identifier of the authorized account, used when the resource authorization application performs open authorization. The resource authorization application establishes the matching relationship between the access token and the authorized account, that is, record an association relationship between the resource authorization application, the authorized application, and the identifier of the authorized account. The client of the resource authorization application may alternatively record the resource request application for which the resource authorization application has performed open authorization, and establish the matching relationship between the access token and the authorized account. For example, a client of a resource authorization application A and a client of a resource request application a are installed on the terminal. An account that logs in to the resource authorization application A when the resource authorization application A performs first open authorization is account B. The first open authorization is specifically open authorization performed for the resource request application a. The client of the resource authorization application A may record an identifier of the account B, and record a matching relationship between the identifier of the account B and an access token authorized during the first open authorization, or may record a matching relationship between the identifier of the account B and the resource request application a. Optionally, the unified account management module in the terminal may record an open authorization relationship between the authorized account B of the resource authorization application A and the resource request application a, and the unified account management module manages the access token.

Next, the following specifically describes how the terminal obtains the matching relationship between the access token and the authorized account from the server. The terminal sends an access token generation request to the server when the authorized account is in the login state, where the access token generation request includes the identifier of the authorized account. The server generates the access token based on the access token generation request, and establishes the matching relationship between the access token and the authorized account. The server sends the matching relationship between the access token and the authorized account to the terminal.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Next, the following specifically describes the access token management method provided in the embodiments of this application. In this embodiment, after obtaining an access token, a client of a resource request application on a terminal may record a resource authorization application that performs open authorization for the resource request application, and an authorized account identifier, and establish a matching relationship with the access token.

When initiating an authorized login, the client of the resource request application determines the resource authorization application and the authorized account identifier based on the established matching relationship.

Whether the authorized account identifier matching the access token is consistent with a current login account of the resource authorization application is verified.

The verification may be performed in the following two manners.

a. The resource authorization application provides a query interface. In this case, the client of the resource request application initiates a matching query request to the resource authorization application, and sends, to the resource authorization application, the authorized account identifier matching the access token. The resource authorization application verifies whether an identifier of the current login account is the same as the authorized account identifier, and returns a verification result. The client of the resource request application determines, based on the verification result, whether to use the access token for a login this time. If the verification result shows that the authorized account is different from the current login account of the resource authorization application, a user is required to re-perform an open authorization procedure.

b. The resource authorization application registers an identifier of the current login account of the resource authorization application with a unified account management module, and a system provides a query interface. In this case, the client of the resource request application sends a query request to the unified account management module. The query request carries a resource authorization application identifier and the authorized account identifier that correspond to the access token. The unified account management module performs verification. In an example, the unified account management module may return a verification result to the client of the resource request application. The client of the resource request application determines, based on the verification result, whether to use the access token for a login this time. If the verification result shows that the authorized account is different from the current login account of the resource authorization application, a user is required to re-perform an open authorization procedure. In an example, if the verification result shows that the authorized account is different from the current login account of the resource authorization application, the unified account management module instructs a storage management module to deny access of the client of the resource request application to the access token.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Next, the following specifically describes the access token management method provided in the embodiments of this application. In this embodiment, after obtaining an access token, a client of a resource request application registers, with a unified account management module, a resource authorization application that performs open authorization for the resource request application, an identifier of an authorized account, and a storage address of the access token. The unified account management module performs unified management on all authorization relationships on a terminal, and performs access control on access token storage addresses.

When an account A of an authorization application on the terminal logs out, the unified account management module determines, based on a recorded access token, a resource authorization application corresponding to the access token, and an authorized account, all access tokens authorized by the account A, may freeze permission to access a storage address of the determined access token, and unfreeze the permission to access the storage address of the access token until it is found, through querying, that the account A re-logs in to the resource authorization application. Alternatively, when the account A logs out, the unified account management module may delete an access token authorized by the account A.

Optionally, when the logout of the account A is because the account A is pushed out, the terminal automatically freezes the permission to access the storage address of the access token authorized by the account A, or deletes the access token authorized by the account A.

Figure 11A:
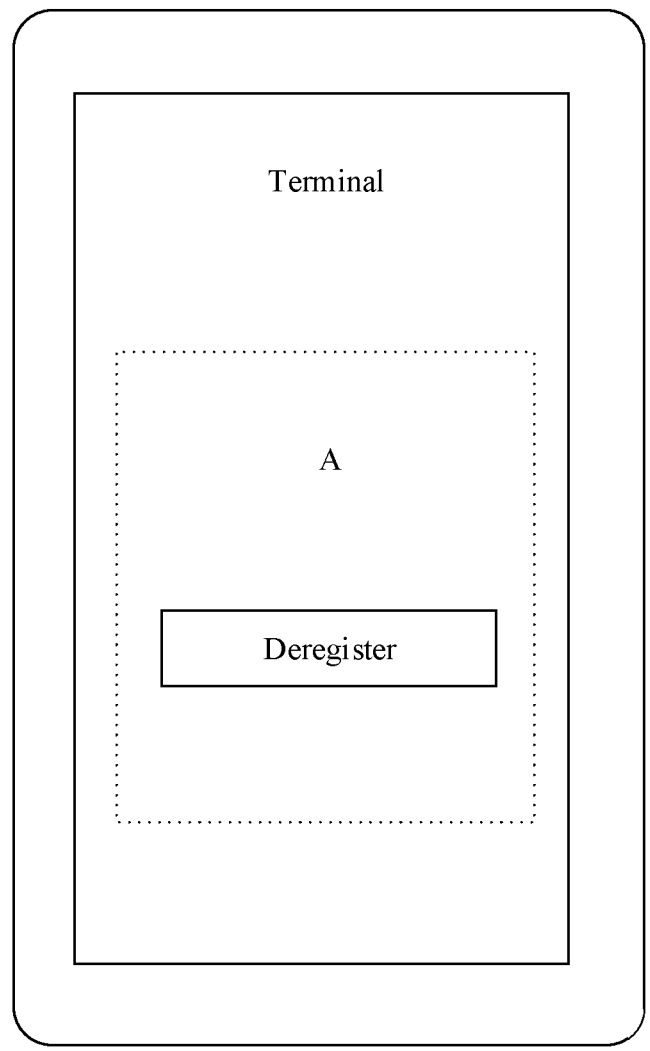
FIG. 11A is an effect display diagram of an access token management method according to an embodiment of this application.
Figure 11B:
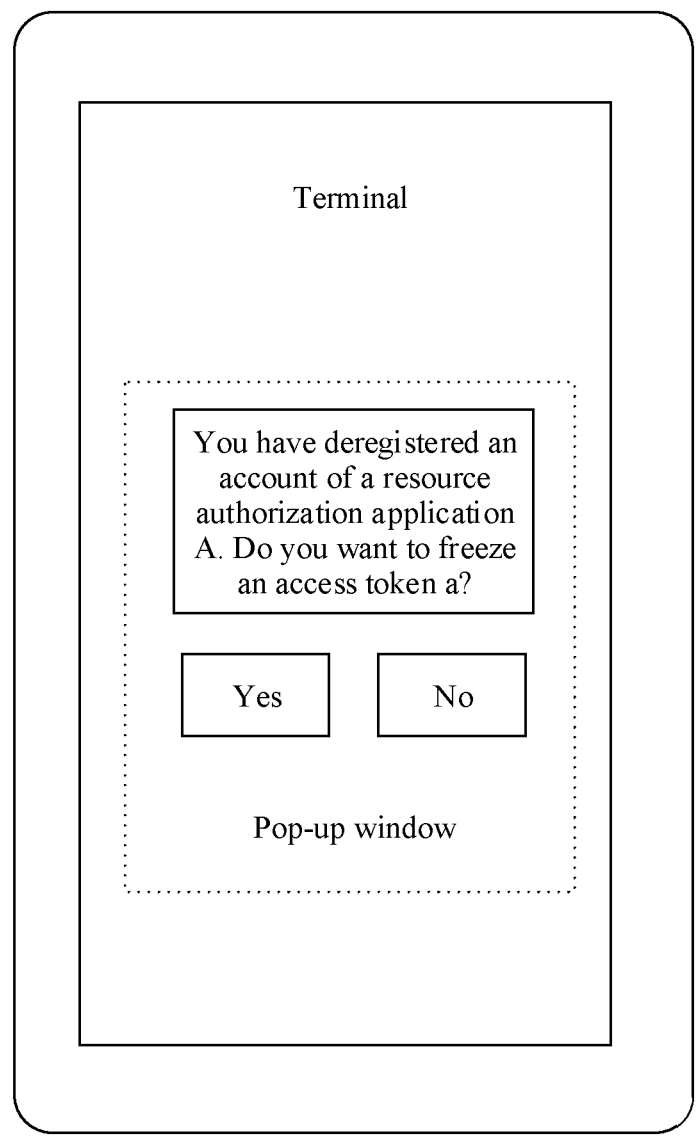
FIG. 11B is an effect display diagram of an access token management method according to an embodiment of this application.

Optionally, when the logout of the account A is because a user proactively deregisters an authorized account from the resource authorization application, the terminal may ask, in a prompting/message pushing manner, the user to choose whether to freeze the storage address of the access token. Specifically, as shown in FIG. 11A, the user deregisters an authorized account on a client of a resource authorization application A. Then, the terminal displays a pop-up window, as shown in FIG. 11B, prompting the user whether to freeze an access token a authorized by the authorized account.

According to the access token management method provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 12:
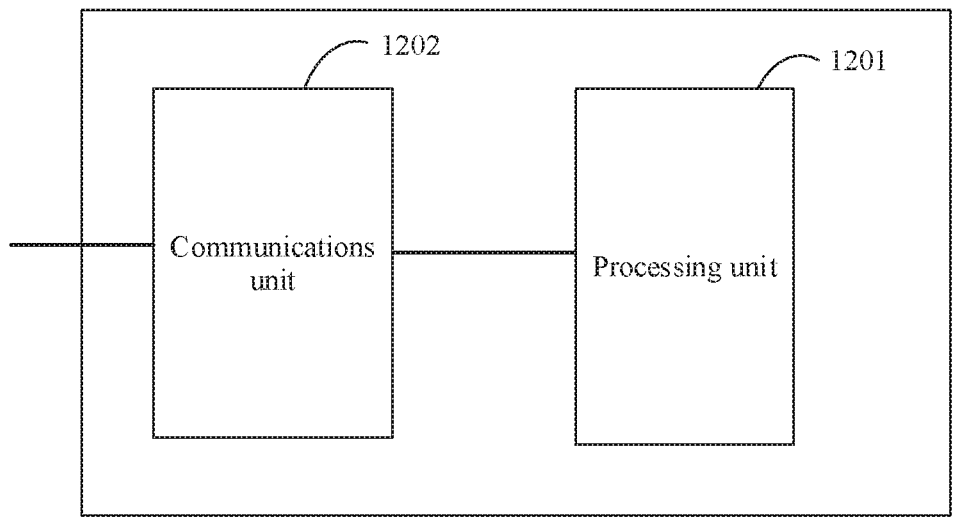
FIG. 12 is a schematic structural diagram of a server according to an embodiment of this application.

An embodiment of this application provides a first server. As shown in FIG. 12, the first server includes a processing unit 1201 and a communications unit 1202. The communications unit 1202 is configured to obtain an access token and login information of an authorized account corresponding to the access token in a terminal, where the access token is a credential used for accessing a protected resource in the server 1200, and the authorized account is an account that logs in to a resource authorization application on the terminal when the resource authorization application authorizes the access token; and the processing unit 1201 is configured to: when the login information indicates that the authorized account is in a non-login state, perform invalidation processing on the access token.

Optionally, the communications unit 1202 is further configured to receive an access token generation request, where the access token generation request includes an identifier of the authorized account.

The processing unit 1201 is further configured to: generate the access token based on the access token generation request, and establish a matching relationship between the access token and the authorized account based on the identifier of the authorized account.

Optionally, the login information includes an identifier of a current login account of the resource authorization application; and the processing unit 1201 is further configured to determine, based on the matching relationship between the access token and the authorized account, whether the current login account matches the access token. When the current login account does not match the access token, to be specific, indicating that the current login account is not the authorized account, the processing unit 1201 is configured to perform invalidation processing on the access token.

Optionally, the communications unit 1202 is further configured to receive a resource access request from the terminal, where the resource access request includes the access token and the login information.

Optionally, the communications unit 1202 is further configured to receive the access token and a terminal identifier from the terminal.

The processing unit 1201 is further configured to obtain the login information based on the terminal identifier, where the login information includes the identifier of the current login account of the resource authorization application on the terminal.

Optionally, the first server may be an authorization server. The communications unit 1202 is further configured to obtain the access token and the login information from a resource server, where the access token and the login information that are in the resource server are received from the terminal.

Optionally, the first server may be an authorization server. The communications unit 1202 is further configured to receive the access token and the login information from the resource server, where the login information in the resource server is obtained through querying performed by the resource server based on a terminal identifier, and the terminal identifier in the resource server is received by the resource server from the terminal.

Optionally, the performing, by the processing unit 1201, invalidation processing on the access token includes any one of the following: deleting the access token; freezing the access token; or denying access to a user resource initiated by the terminal by using the access token.

Functions of functional units of the first server provided in this embodiment of this application may be implemented with reference to the method embodiment shown in FIG. 4 or FIG. 5 above. Details are not described herein again.

According to the server provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides a second server. Still referring to FIG. 12, the second server includes a processing unit 1201 and a communications unit 1202. The communications unit 1202 is configured to obtain an access token restriction request, where the access token restriction request includes a terminal identifier and an identifier of an authorized account of a resource authorization application on a terminal corresponding to the terminal identifier, and the authorized account is an account that logs in to the resource authorization application when the resource authorization application authorizes an access token; and the processing unit 1201 is configured to perform, based on the access token restriction request, invalidation processing on an access token corresponding to the terminal identifier and the identifier of the authorized account.

Optionally, the communications unit 1202 is further configured to receive an access token generation request, where the access token generation request includes the terminal identifier and the identifier of the authorized account.

The processing unit 1201 is further configured to: generate the access token based on the access token generation request, and establish a matching relationship between the access token, the authorized account, and the terminal identifier.

Optionally, the second server may be an authorization server. The communications unit 1202 is further configured to obtain the access token restriction request from a resource server.

Optionally, the communications unit 1202 is further configured to obtain the access token restriction request from the terminal.

Optionally, the communications unit 1202 is further configured to send restriction information of the access token to the terminal identified by the terminal identifier, so that the terminal displays a prompt of unfreezing the access token by using the authorized account.

Optionally, the performing, by the processing unit 1201 based on the access token restriction request, invalidation processing on an access token corresponding to the terminal identifier and the identifier of the authorized account includes any one of the following:

deleting the access token; freezing the access token; or denying access to a user resource initiated by the terminal by using the access token.

Functions of functional units of the second server in this embodiment of this application may be implemented with reference to the method embodiment shown in FIG. 6 or FIG. 7 above.

According to the server provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 13:
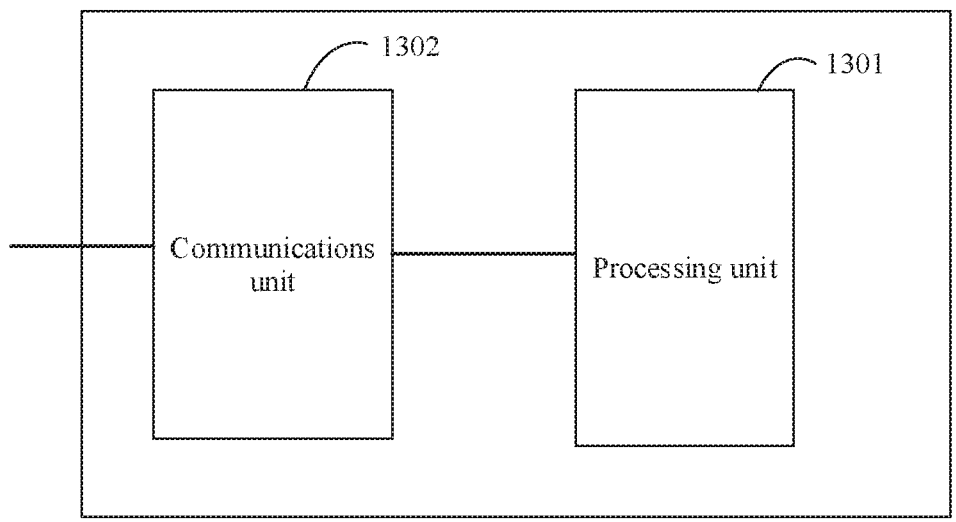
FIG. 13 is a schematic structural diagram of a terminal according to an embodiment of this application.

An embodiment of this application provides a first terminal. As shown in FIG. 13, the first terminal includes a processing unit 1301 and a communications unit 1302. The processing unit 1301 controls the communications unit 1302, which is configured to: send, to a server, an access token and login information of an authorized account corresponding to the access token in the terminal, where the access token is a credential used for accessing a protected resource in the server, and the authorized account is an account that logs in to a resource authorization application on the terminal when the resource authorization application authorizes the access token; and when the login information indicates that the authorized account is in a non-login state, the login information is used for the server to perform invalidation processing on the access token.

Functions of functional units of the first terminal in this embodiment of this application may be implemented with reference to the method embodiment shown in FIG. 4 or FIG. 5 above.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides a second terminal. Still referring to FIG. 13, the second terminal includes a processing unit 1301 and a communications unit 1302. The processing unit 1301 controls the communications unit 1302, which is configured to send an access token restriction request to a server, where the access token restriction request includes an identifier of the terminal and an identifier of an authorized account of a resource authorization application on the terminal, the authorized account is an account that logs in to the resource authorization application when the resource authorization application authorizes an access token, and the access token restriction request is used for the server to perform invalidation processing on an access token corresponding to the identifier of the terminal and the identifier of the authorized account.

Functions of functional units of the second terminal in this embodiment of this application may be implemented with reference to the method embodiment shown in FIG. 6 or FIG. 7 above.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides a third terminal. Still referring to FIG. 13, the third terminal includes a processing unit 1301 and a communications unit 1302. The processing unit 1302 is configured to obtain current status information of a resource authorization application on the terminal; and the processing unit 1301 is configured to restrict an access token of a resource request application on the terminal based on the current status information of the resource authorization application, where the access token is an access token obtained by the resource request application from a server by using the resource authorization application when an authorized account is in a login state, and the access token and the authorized account have a matching relationship.

Optionally, the restricting, by the processing unit 1301, an access token of a resource request application on the terminal based on the current status information of the resource authorization application includes any one of the following:

deleting the access token freezing the access token; or denying extracting of the access token by the resource request application.

Optionally, the communications unit 1302 is further configured to send an access token generation request to the server when the authorized account is in the login state, where the access token generation request includes an identifier of the authorized account, and the access token generation request is used for the server to generate the access token and establish the matching relationship between the access token and the authorized account.

The communications unit 1302 is further configured to receive the matching relationship from the server.

Functions of functional units of the third terminal in this embodiment of this application may be implemented with reference to the method embodiment shown in FIG. 9 above.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 14:
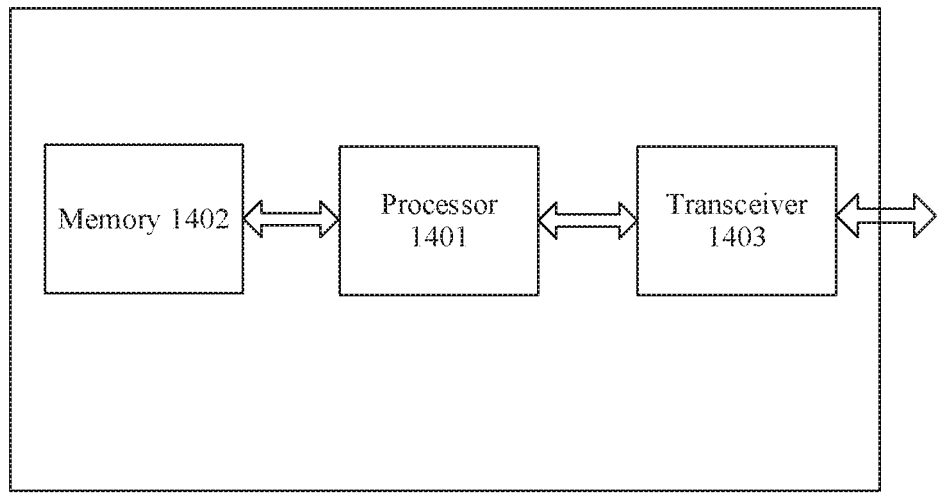
FIG. 14 is a schematic structural diagram of a server according to an embodiment of this application.

An embodiment of this application provides a third server. As shown in FIG. 14, the third server 1400 includes a processor 1401, a memory 1402, and a transceiver 1403. The memory 1402 stores code. The processor 1401 executes the code to implement a corresponding control operation. The transceiver 1403 is configured to obtain an access token and login information of an authorized account corresponding to the access token in a terminal, where the access token is a credential used for accessing a protected resource in the third server, and the authorized account is an account that logs in to a resource authorization application on the terminal when the resource authorization application authorizes the access token and when the login information indicates that the authorized account is in a non-login state, the processor 1401 is configured to perform invalidation processing on the access token.

Optionally, the transceiver 1403 is further configured to receive an access token generation request, where the access token generation request includes an identifier of the authorized account.

The processor 1401 is further configured to: generate the access token based on the access token generation request, and establish a matching relationship between the access token and the authorized account based on the identifier of the authorized account.

Optionally, the login information includes an identifier of a current login account of the resource authorization application; and the processor 1401 is further configured to determine, based on the matching relationship between the access token and the authorized account, whether the current login account matches the access token. When the current login account does not match the access token, the processor 1401 is configured to perform invalidation processing on the access token.

Optionally, the transceiver 1403 is configured to receive a resource access request from the terminal, where the resource access request includes the access token and the login information.

Optionally, the transceiver 1403 is further configured to receive the access token and a terminal identifier from the terminal.

The processor 1401 obtains the login information based on the terminal identifier, where the login information includes the identifier of the current login account of the resource authorization application on the terminal.

Optionally, the third server may be an authorization server. The transceiver 1403 is further configured to obtain the access token and the login information from a resource server, where the access token and the login information that are in the resource server are received from the terminal.

Optionally, the third server may be an authorization server. The transceiver 1403 is further configured to receive the access token and the login information from the resource server, where the login information in the resource server is obtained through querying performed by the resource server based on a terminal identifier, and the terminal identifier in the resource server is received by the resource server from the terminal.

Optionally, the performing, by the processor 1401, invalidation processing on the access token includes any one of the following:

deleting the access token; freezing the access token; or denying access to a user resource initiated by the terminal by using the access token.

Specific implementations of components/devices of the third server in this embodiment of this application may be implemented with reference to the method embodiment shown in FIG. 4 or FIG. 5 above. Details are not described herein again.

The server provided in this embodiment of this application may perform corresponding processing on the access token based on a login status of the authorized account corresponding to the access token in the terminal. In this way, a life status of the access token is managed by controlling the authorized account and/or authorization application status information, management of a login to the resource request application and management of resource access to the resource authorization application are enhanced, and an information leakage risk is reduced.

An embodiment of this application provides a fourth server. Still referring to FIG. 14, the fourth server includes a processor 1401, a memory 1402, and a transceiver 1403. The memory 1402 stores code. The processor 1401 executes the code to implement a corresponding control operation. The transceiver 1403 is configured to obtain an access token restriction request, where the access token restriction request includes a terminal identifier and an identifier of an authorized account of a resource authorization application on a terminal corresponding to the terminal identifier, and the authorized account is an account that logs in to the resource authorization application when the resource authorization application authorizes an access token; and the processor 1401 is configured to perform, based on the access token restriction request, invalidation processing on an access token corresponding to the terminal identifier and the identifier of the authorized account.

Optionally, the transceiver 1403 is further configured to receive an access token generation request, where the access token generation request includes the terminal identifier and the identifier of the authorized account.

The processor 1401 is further configured to: generate the access token based on the access token generation request, and establish a matching relationship between the access token, the authorized account, and the terminal identifier.

Optionally, the fourth server may be an authorization server. The transceiver 1403 is further configured to obtain the access token restriction request from a resource server.

Optionally, the transceiver 1403 is further configured to obtain the access token restriction request from the terminal.

Optionally, the transceiver 1403 is further configured to send restriction information of the access token to the terminal identified by the terminal identifier, so that the terminal displays a prompt of unfreezing the access token by using the authorized account.

Optionally, the performing, by the processor 1401 based on the access token restriction request, invalidation processing on an access token corresponding to the terminal identifier and the identifier of the authorized account includes any one of the following:

deleting the access token; freezing the access token; or denying access to a user resource initiated by the terminal by using the access token.

Specific implementations of components/devices of the fourth server in this embodiment of this application may be implemented with reference to the method embodiment shown in FIG. 6 or FIG. 7 above. Details are not described herein again.

According to the server provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

Figure 15:
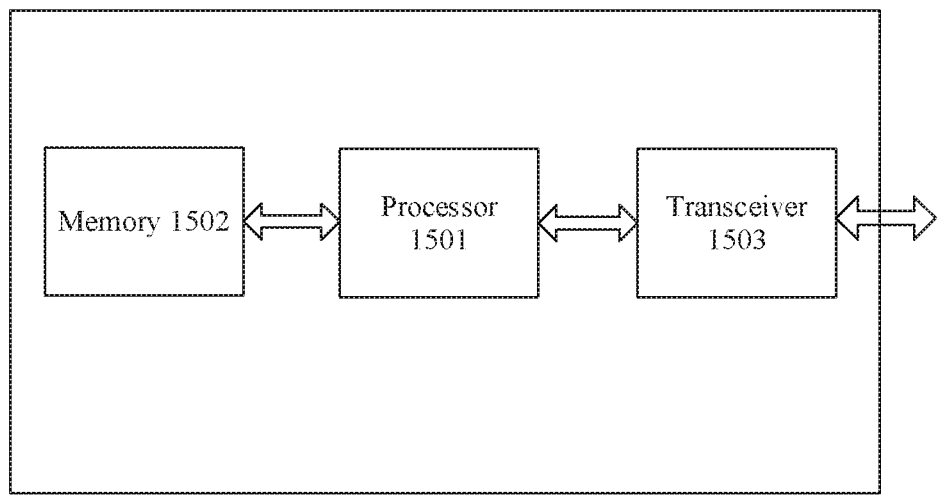
FIG. 15 is a schematic structural diagram of a terminal according to an embodiment of this application.

An embodiment of this application provides a fourth terminal. As shown in FIG. 15, the fourth terminal includes a processor 1501, a memory 1502, and a transceiver 1503. The memory 1502 stores code. The processor 1501 executes the code to implement a corresponding control operation. The transceiver 1503 is configured to send, to a server, an access token and login information of an authorized account corresponding to the access token in the terminal, where the access token is a credential used for accessing a protected resource in the server, and the authorized account is an account that logs in to a resource authorization application on the terminal when the resource authorization application authorizes the access token; and when the login information indicates that the authorized account is in a non-login state, the login information is used for the server to perform invalidation processing on the access token.

Specific implementations of components/devices of the fourth terminal in this embodiment of this application may be implemented with reference to the method embodiment shown in FIG. 4 or FIG. 5 above. Details are not described herein again.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides a fifth terminal. Still referring to FIG. 15, the fifth terminal includes a processor 1501, a memory 1502, and a transceiver 1503. The memory 1502 stores code. The processor 1501 executes the code to implement a corresponding control operation. The transceiver 1503 is configured to send an access token restriction request to a server, where the access token restriction request includes an identifier of the terminal and an identifier of an authorized account of a resource authorization application on the terminal, and the authorized account is an account that logs in to the resource authorization application when the resource authorization application authorizes an access token; and the access token restriction request is used for the server to perform invalidation processing on an access token corresponding to the identifier of the terminal and the identifier of the authorized account.

Specific implementations of components/devices of the fifth terminal in this embodiment of this application may be implemented with reference to the method embodiment shown in FIG. 6 or FIG. 7 above. Details are not described herein again.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides a sixth terminal. Still referring to FIG. 15, the sixth terminal includes a processor 1501, a memory 1502, and a transceiver 1503. The memory 1502 stores code. The processor 1501 executes the code to implement a corresponding control operation. The transceiver 1503 is configured to obtain current status information of a resource authorization application on the terminal; and the processor 1501 is configured to restrict an access token of a resource request application on the terminal based on the current status information of the resource authorization application, where the access token is an access token obtained by the resource request application from a server by using the resource authorization application when an authorized account is in a login state, and the access token and the authorized account have a matching relationship.

Optionally, the restricting, by the processor 1501, an access token of a resource request application on the terminal based on the current status information of the resource authorization application includes any one of the following:

deleting the access token; freezing the access token; or denying extracting of the access token by the resource request application.

Optionally, the transceiver 1503 is further configured to send an access token generation request to the server when the authorized account is in the login state, where the access token generation request includes an identifier of the authorized account, and the access token generation request is used for the server to generate the access token and establish the matching relationship between the access token and the authorized account.

The transceiver 1503 is further configured to receive the matching relationship from the server.

Specific implementations of components/devices of the sixth terminal in this embodiment of this application may be implemented with reference to the method embodiment shown in FIG. 9 above. Details are not described herein again.

According to the terminal provided in this embodiment of this application, corresponding processing may be performed on the access token based on a login status of the authorized account corresponding to the access token in the terminal; and when the authorized account authorizing the access token does not log in on the terminal, invalidation processing may be performed on the access token. In this way, a life status of the access token is managed by controlling the authorized account and/or authorization application status information, management of a login to the resource request application and management of resource access to the resource authorization application are enhanced, and an information leakage risk is reduced.

An embodiment of this application provides an access token management system. The system includes the third server described above and the fourth terminal described above. For beneficial effects of the system, refer to the foregoing content descriptions related to the third server and the fourth terminal. Details are not described herein again.

An embodiment of this application further provides an access token management system. The system includes the fourth server and the fifth terminal described above. For beneficial effects of the system, refer to the foregoing content descriptions related to the fourth server and the fifth terminal. Details are not described herein again.

It should be noted that the processor in the embodiments of this application may be a central processing unit (Central Processing Unit, CPU), may be another general-purpose processor, a digital signal processor (Digital Signal Processor, DSP), an application-specific integrated circuit (Application Specific Integrated Circuit, ASIC), a field programmable gate array (Field Programmable Gate Array, FPGA), or another programmable logical device, a transistor logical device, a hardware component, or any combination thereof. The general-purpose processor may be a microprocessor or any regular processor or the like.

Method steps in the embodiments of this application may be implemented by hardware, or may be implemented by a processor executing a software instruction. The software instruction may include a corresponding software module. The software module may be stored in a random access memory (Random Access Memory, RAM), a flash memory, a read-only memory (Read Only Memory, ROM), a programmable read only memory (Programmable ROM, PROM), an erasable programmable read only memory (Erasable Programmable ROM, EPROM), an electrically erasable programmable read only memory (Electrically EPROM, EEPROM), a register, a hard disk, a mobile hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be located in the ASIC. In addition, the ASIC may be located in a server or terminal.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instruction may be stored in a computer readable storage medium, or may be transmitted by using the computer readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

It may be understood that numerical symbols involved in the embodiments of this application are differentiated merely for ease of description, but are not used to limit the scope of the embodiments of this application.

It should be understood that sequence numbers of the foregoing processes do not mean execution sequences in the embodiments of this application. The execution sequences of the processes should be determined based on functions and internal logic of the processes, and should not be construed as any limitation on the implementation processes of the embodiments of this application.

The foregoing descriptions are merely specific implementations of the embodiment of this application. Any variation or replacement readily figured out by a person skilled in the art within the technical scope disclosed in this application shall fall within the protection scope in the embodiment of this application.

What is claimed is:

1. An access token management method, implemented by a server, wherein the access token management method comprises:

receiving an access token generation request from a terminal, wherein the access token generation request comprises user information of a first account, wherein the first account is used to log in to a first application on the terminal, wherein the first application comprises an open authorization function configured to authorize a second application on the terminal to access a protected resource by the access token;

generating the access token in response to the access token generation request;

sending the access token to the terminal;

receiving the access token from the terminal and authorizing the second application to access the protected resource;

obtaining login information of the first account;

marking the access token state when the obtained login information indicates the first account state is non-logged in;

performing invalidation processing on the access token when the login information is marked as in a non-login state on the terminal; and denying the access to the protected resource of the second application of the terminal when the access token is invalid.

2. The access token management method of claim 1, further comprising storing a relationship between the access token and the first account.

3. The access token management method of claim 2, further comprising:

obtaining a current login account of the first application; and performing invalidation processing on the access token when the current login account is different from the first account.

4. The access token management method of claim 1, wherein the login information of the first account comprises a current login account of the first application.

5. The access token management method of claim 1, further comprising:

freezing the access token on the terminal; or denying a user access to the protected resource of the second application; or deleting the access token.

6. A server, comprising:

a processor; and a memory coupled to the processor and storing instructions that, when executed by the processor, cause the server to be configured to:

receive an access token generation request from a terminal, wherein the access token generation request comprises user information of a first account, wherein the first account is used to log in to a first application on the terminal, wherein the first application comprises an open authorization function configured to authorize a second application to access a protected resource by the access token;

generate the access token in response to the access token generation request;

send the access token to the terminal;

receive the access token from the terminal and authorizing the second application on the terminal to access the protected resource;

obtain login information of the first account;

mark the access token state when the obtained login information indicates the first account state is non-logged in;

perform invalidation processing on the access token when the login information is marked as in a non-login state on the terminal; and deny access to the protected resource of the second application of the terminal when the access token is invalid.

7. The server of claim 6, wherein the instructions further cause the server to be configured to store a relationship between the access token and the first account.

8. The server of claim 6, wherein the instructions further cause the server to be configured to:

obtain current login account of the first application; and perform invalidation processing on the access token when the current login account is different from the first account.

9. The server of claim 6, wherein the login information comprises information about deletion of the first application from the terminal.

10. The server of claim 6, wherein the instructions further cause the server to be configured to:

freeze the access token on the terminal; or deny a user access to the protected resource of the second application; or delete the access token.

11. A terminal, comprising:

a processor; and a memory coupled to the processor and storing instructions that, when executed by the processor, cause the terminal to be configured to:

obtain login information of a first account of a first application corresponding to an access token in the terminal, wherein the access token comprises a credential for accessing a protected resource in the server, wherein the first account is an account configured to log in to the first application on the terminal when the first application authorizes the access token;

authorize, by the first application, a second application to access the protected resource by an open authorization function;

mark the access token state when the obtained login information indicates the first account state is non-logged in;

perform invalidation processing on the access token when the login information indicates that the first account is marked as in a non-login state; and deny the access to the protected resource of the second application when the access token is invalid.

12. The terminal of claim 11, wherein the instructions further cause the terminal to be configured to send, to the server, an access token generation request, wherein the access token generation request comprises the user information of the first account, and wherein the first account is used to log in to the first application when the first application authorizes the access token for the second application.

13. The terminal of claim 11, wherein the instructions further cause the terminal to be configured to receive, from the server, the access token in response to an access token generation request.

14. The terminal of claim 11, wherein the login information comprises log-out information about the first account of the first application.

15. The terminal of claim 11, wherein the instructions further cause the terminal to be configured to:

freeze the access token on the terminal; or deny a user access to the protected resource of the second application; or delete the access token.

16. The terminal of claim 11, wherein the instructions further cause the terminal to be configured to display an inquiry whether to invalidate the access token when the first account is logged-out.

17. The terminal of claim 11, wherein the instructions further cause the terminal to be configured to:

send log out information of the first account to the server; or send information of deletion of the first application to the server.

18. The terminal of claim 11, wherein the instructions further cause the terminal to be configured to:

receive an access token restriction request from the server; and perform invalidation processing on the access token in response to the access token restriction request.

19. The access token management method of claim 1, further comprising denying a user access to a second resource.

20. The server of claim 6, wherein the instructions further cause the server to be configured to deny access to a second resource using the access token.

\* \* \* \* \*